(12) United States Patent
Islam et al.

(10) Patent No.: US 10,284,278 B2
(45) Date of Patent: May 7, 2019

(54) BEAM MANAGEMENT FOR VARIOUS LEVELS OF BEAM CORRESPONDENCE

(71) Applicant: QUALCOMM Incorporated, San Diego, CA (US)

(72) Inventors: Muhammad Nazmul Islam, Edison, NJ (US); Sundar Subramanian, Bridgewater, NJ (US); Junyi Li, Chester, NJ (US); Juergen Cezanne, Ocean Township, NJ (US); Navid Abedini, Raritan, NJ (US); Bilal Sadiq, Basking Ridge, NJ (US); Tao Luo, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/637,885

(22) Filed: Jun. 29, 2017

(65) Prior Publication Data

US 2018/0131434 A1 May 10, 2018

Related U.S. Application Data

(60) Provisional application No. 62/418,086, filed on Nov. 4, 2016.

(51) Int. Cl.
*H04M 1/00* (2006.01)
*H04B 7/08* (2006.01)
(Continued)

(52) U.S. Cl.
CPC ............ *H04B 7/086* (2013.01); *H01Q 1/246* (2013.01); *H01Q 3/2605* (2013.01);
(Continued)

(58) Field of Classification Search
CPC .... H04B 7/086; H04B 7/0408; H04B 7/0615; H04B 7/0814; H04B 7/088; H01Q 1/246; H01Q 3/2605; H04W 16/28
(Continued)

(56) References Cited

U.S. PATENT DOCUMENTS

| 2011/0110453 A1* | 5/2011 | Prasad | H04B 7/0695 375/285 |
| 2013/0217404 A1* | 8/2013 | Jung | H04W 72/08 455/452.1 |

(Continued)

OTHER PUBLICATIONS

Nokia: "Beam Management Procedures in Beam Based Access", 3GPP TSG-RAN WG1#86, R1-167286, Gothenburg, Sweden, Aug. 22-26, 2016, pp. 1-5.
(Continued)

*Primary Examiner* — Sanh D Phu
(74) *Attorney, Agent, or Firm* — Holland & Hart LLP

(57) ABSTRACT

Techniques are described for wireless communication. One method includes performing a first beam sweep procedure to determine a first beam pair that includes a transmit beam of a first wireless node and a receive beam of a second wireless node, identifying a level of correspondence at one or both of the first wireless node and the second wireless node, the level of correspondence being between a transmit beam and a receive beam of a respective wireless node and determining, based on the level of correspondence, a range of a second beam sweep procedure to be performed in determining a second beam pair that includes a transmit beam of the second wireless node and a receive beam of the first wireless node.

30 Claims, 13 Drawing Sheets

(51) Int. Cl.
  *H01Q 1/24* (2006.01)
  *H01Q 3/26* (2006.01)
  *H04B 7/0408* (2017.01)
  *H04B 7/06* (2006.01)
  *H04W 16/28* (2009.01)
  *H04W 72/04* (2009.01)

(52) U.S. Cl.
  CPC ......... *H04B 7/0408* (2013.01); *H04B 7/0615* (2013.01); *H04B 7/0617* (2013.01); *H04B 7/0695* (2013.01); *H04B 7/088* (2013.01); *H04B 7/0814* (2013.01); *H04W 16/28* (2013.01); *H04W 72/046* (2013.01)

(58) Field of Classification Search
  USPC ....................................................... 455/562.1
  See application file for complete search history.

(56) References Cited

U.S. PATENT DOCUMENTS

2016/0285583 A1  9/2016  Kasher et al.
2017/0055298 A1  2/2017  Pawar et al.

OTHER PUBLICATIONS

Nokia: "On Beam Management for NR—Reciprocity Assumptions", 3GPP TSG-RAN WG1 #86 Bis, R1-1610241, Lisbon, Portugal, Oct. 10-14, 2016, pp. 1-4.

Nokia: "On Beam Management in NR—Procedures", 3GPP TSG-RAN WG1 #86 Bis, R1- 1610239, Lisbon, Portugal, Oct. 10-14, 2016, pp. 1-4.

International Search Report and Written Opinion—PCT/US2017/055713—ISA/EPO—Jan. 3, 2018.

Samsung: "Framework for Beamformed Access", 3GPP Draft; R1-164013, 3rd Generation Partnership Project (3GPP), Mobile Competence Centre; 650, Route Des Lucioles; F-06921 Sophia-Anti Polls Cedex; France, vol. RAN WG1, No. Nanjing, China; May 13, 2016, XP051090295, Retrieved from the Internet: URL:http://www.3gpp.org/ftp/tsg_ran/WG1_RL1/TSGR1_85/Docs/ [retrieved on May 13, 2016], 4 pages.

Sony : "Discussion on Beam Training Procedure of NR MIMO", 3GPP Draft; R1-1609379, 3rd Generation Partnership Project (3GPP), Mobile Competence Centre; 650, Route Des Lucioles; F-06921 Sophia-Anti Polls Cedex; France, vol. RAN WG1, No. Oct. 9, 2016, XP051149422, Retrieved from the Internet: URL:http://www.3gpp.org/ftp/Meetings_3GPP_SYNC/RAN1/Docs/ [retrieved on Oct. 9, 2016], 5 pages.

Xinwei: "Beam Management Views and Designs", 3GPP Draft; R1-1609691, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051149726, Retrieved from the Internet: URL:http://www.3gpp.org/ftp/Meetings_3GPP_SYNC/RAN1/Docs/ [retrieved on Oct. 9, 2016], 12 pages.

\* cited by examiner

BEAM MANAGEMENT FOR VARIOUS LEVELS OF BEAM CORRESPONDENCE

CROSS REFERENCES

The present Application for Patent claims priority to U.S. Provisional Patent Application No. 62/418,086 by Islam, et al., entitled "Beam Management For Various Levels of Beam Reciprocity," filed Nov. 4, 2016, assigned to the assignee hereof.

BACKGROUND

The following relates to wireless communication systems, and more particularly to beam management for various levels of beam correspondence.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communication between two wireless nodes, e.g., between a base station and a UE, may use beams or beamformed signals for transmission and/or reception. A base station may transmit beamformed signals on downlink (DL) beams associated with the base station. A UE may receive a signal on one or more DL beams associated with the UE. The DL beam associated with the base station and the DL beam associated with the UE used for DL communication between the base station and the UE constitute a DL beam pair. Similarly, a UE may transmit beamformed signals on uplink (UL) beams associated with the UE. A base station may receive a signal on one or more UL beams associated with the base station. The UL beam associated with the UE and the UL beam associated with the base station used for UL communication between the UE and the base station constitute an UL beam pair. In some instances, the DL beam pair and the UL beam pair may be the same (e.g., may represent the same beam pairs). In other instances, differences may exist between a DL beam pair and an UL beam pair.

SUMMARY

Some examples of wireless communication systems support beam management for various levels of beam correspondence in accordance with various aspects of the present disclosure. In the present disclosure the term "beam correspondence" may also be referred to as "beam reciprocity." A downlink (DL) transmission, via one or more beams, from a transmitting wireless node may be used to identify a corresponding DL reception beam for a receiving wireless node. The DL transmission beam and DL reception beam may be identified as a beam pair for the wireless nodes. Additionally, if a level of beam correspondence exists, the DL beam training information may be used to identify a beam pair for an uplink (UL). Alternatively or additionally, an UL transmission, via one or more beams, from a transmitting wireless node may be used to identify an UL reception beam for a receiving wireless node. In some cases, if a level of beam correspondence between wireless nodes exists, the wireless nodes may avoid performing a beam sweep to identify a beam pair (i.e., transmission beam and reception beam). However, in some examples, the level of beam correspondence may be below a threshold and a wireless node may perform at least a partial beam sweep (e.g., of a plurality of beams, a subset of the plurality of beams, etc.) to identify a beam pair (i.e., a transmission/reception beam) for the wireless nodes.

A method of wireless communication is described. The method may include performing a first beam sweep procedure to determine a first beam pair that includes a transmit beam of a first wireless node and a receive beam of a second wireless node; identifying a level of correspondence at one or both of the first wireless node and the second wireless node, the level of correspondence being between a transmit beam and a receive beam of a respective wireless node; and determining, based on the level of correspondence, a range of a second beam sweep procedure to be performed in determining a second beam pair that includes a transmit beam of the second wireless node and a receive beam of the first wireless node.

An apparatus for wireless communication is described. The apparatus may include means for performing a first beam sweep procedure to determine a first beam pair that includes a transmit beam of a first wireless node and a receive beam of a second wireless node; means for identifying a level of correspondence at one or both of the first wireless node and the second wireless node, the level of correspondence being between a transmit beam and a receive beam of a respective wireless node; and means for determining, based on the level of correspondence, a range of a second beam sweep procedure to be performed in determining a second beam pair that includes a transmit beam of the second wireless node and a receive beam of the first wireless node.

Another apparatus for wireless communication is described. The apparatus may include a processor, memory in electronic communication with the processor, and instructions stored in the memory. The instructions may be operable to cause the processor to perform a first beam sweep procedure to determine a first beam pair that includes a transmit beam of a first wireless node and a receive beam of a second wireless node; identify a level of correspondence at one or both of the first wireless node and the second wireless node, the level of correspondence being between a transmit beam and a receive beam of a respective wireless node; and determine, based on the level of correspondence, a range of a second beam sweep procedure to be performed in determining a second beam pair that includes a transmit beam of the second wireless node and a receive beam of the first wireless node.

A non-transitory computer readable medium for wireless communication is described. The non-transitory computer-readable medium may include instructions operable to cause a processor to perform a first beam sweep procedure to determine a first beam pair that includes a transmit beam of a first wireless node and a receive beam of a second wireless node; identify a level of correspondence at one or both of the first wireless node and the second wireless node, the level of correspondence being between a transmit beam and a receive beam of a respective wireless node; and determine, based on the level of correspondence, a range of a second beam sweep procedure to be performed in determining a second beam pair that includes a transmit beam of the second wireless node and a receive beam of the first wireless node.

Some examples of the method, apparatus, and non-transitory computer-readable medium described above for determining the range of the second beam sweep procedure to be performed in determining the second beam pair may further include processes, features, means, or instructions for determining that the range of the second beam sweep procedure is equal to a range of the first beam sweep procedure based at least in part on the level of correspondence being below a lower threshold.

Some examples of the method, apparatus, and non-transitory computer-readable medium described above for determining the range of the second beam sweep procedure to be performed in determining the second beam pair may further include processes, features, means, or instructions for determining that no second beam sweep is to be performed based at least in part on the level of correspondence being above an upper threshold.

Some examples of the method, apparatus, and non-transitory computer-readable medium described above for determining the range of the second beam sweep procedure to be performed in determining the second beam pair may further include processes, features, means, or instructions for determining that a partial second beam sweep is to be performed based at least in part on the level of correspondence being above a lower threshold and below an upper threshold.

Some examples of the method, apparatus, and non-transitory computer-readable medium described above may further include processes, features, means, or instructions for determining the range of the second beam sweep procedure to be performed based on a range of calibration values associated with a transmit path and a receive path of the at least one of the first wireless node or the second wireless node. In some examples of the method, apparatus, and non-transitory computer-readable medium described above, the calibration values indicate at least one of an amplitude and phase error of the transmit path and the receive path of the at least one of the first wireless node or the second wireless node.

Some examples of the method, apparatus, and non-transitory computer-readable medium described above may further include processes, features, means, or instructions for determining the range of the second beam sweep procedure to be performed based on a range of beams that includes either the transmit beam of the first wireless node or the receive beam of the second wireless node of the first beam pair.

Some examples of the method, apparatus, and non-transitory computer-readable medium described above may further include processes, features, means, or instructions for determining the range of the second beam sweep procedure based at least in part on a difference of indices between the transmit beam and the receive beam of the first wireless node and the receive beam of the second wireless node of the first beam pair.

In some examples of the method, apparatus, and non-transitory computer-readable medium described above, determining that the partial second beam sweep is to be performed is further based on an identification of a group of one or more downlinks or uplinks which share a same partial second beam sweep.

Some examples of the method, apparatus, and non-transitory computer-readable medium described above may further include processes, features, means, or instructions for identifying the group of one or more links through communications between the first wireless node and the second wireless node. In some examples of the method, apparatus, and non-transitory computer-readable medium described above, the group of one or more links are associated with the first wireless node.

Some examples of the method, apparatus, and non-transitory computer-readable medium described above may further include processes, features, means, or instructions for resetting the group of one or more links as part of a radio link failure (RLF) or handover procedure.

In some examples of the method, apparatus, and non-transitory computer-readable medium described above, determining that the partial second beam sweep is to be performed is further based on a verification that a timer associated with the use of the level of correspondence has expired.

In some examples of the method, apparatus, and non-transitory computer-readable medium described above, determining that the partial second beam sweep is to be performed is further based on whether the second wireless node is participating in an initial access with the first wireless node.

In some examples of the method, apparatus, and non-transitory computer-readable medium described above, determining that the partial second beam sweep is to be performed is further based on whether the second wireless node is awaking in connected mode from a discontinuous reception (DRX) cycle whose duration exceeds a threshold.

In some examples of the method, apparatus, and non-transitory computer-readable medium described above, determining that the partial second beam sweep is to be performed is further based on whether the second wireless node is in an inactive state.

In some examples of the method, apparatus, and non-transitory computer-readable medium described above, the second beam sweep is limited to a beam sweep at only one of the first wireless node or the second wireless node when the level of correspondence at the other of the first wireless node or the second wireless node is above an upper threshold.

Some examples of the method, apparatus, and non-transitory computer-readable medium described above for determining the level of correspondence at one or both of the first wireless node and the second wireless node may further include processes, features, means, or instructions for receiving one or more signals from which the level of correspondence is determined.

In some examples of the method, apparatus, and non-transitory computer-readable medium described above, the first beam sweep procedure is based at least in part on a synchronization signal transmission procedure, a beam reference signal, or a beam refinement reference signal, or a channel state information reference signal (CSI-RS) or a mobility reference signal procedure, or a combination thereof.

Some examples of the method, apparatus, and non-transitory computer-readable medium described above may further include processes, features, means, or instructions for selecting a transmission time of a random access channel (RACH) signal based on the level of correspondence.

Some examples of the method, apparatus, and non-transitory computer-readable medium described above may further include processes, features, means, or instructions for enabling beam coordination between the first wireless node and one or more other wireless nodes when a level of correspondence at either the first wireless node or the second wireless node is less than an upper threshold. In some examples of the method, apparatus, and non-transitory computer-readable medium described above, the beam coordination comprises identification of beams to be reserved as downlink beams and identification of beams to be reserved as uplink beams.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
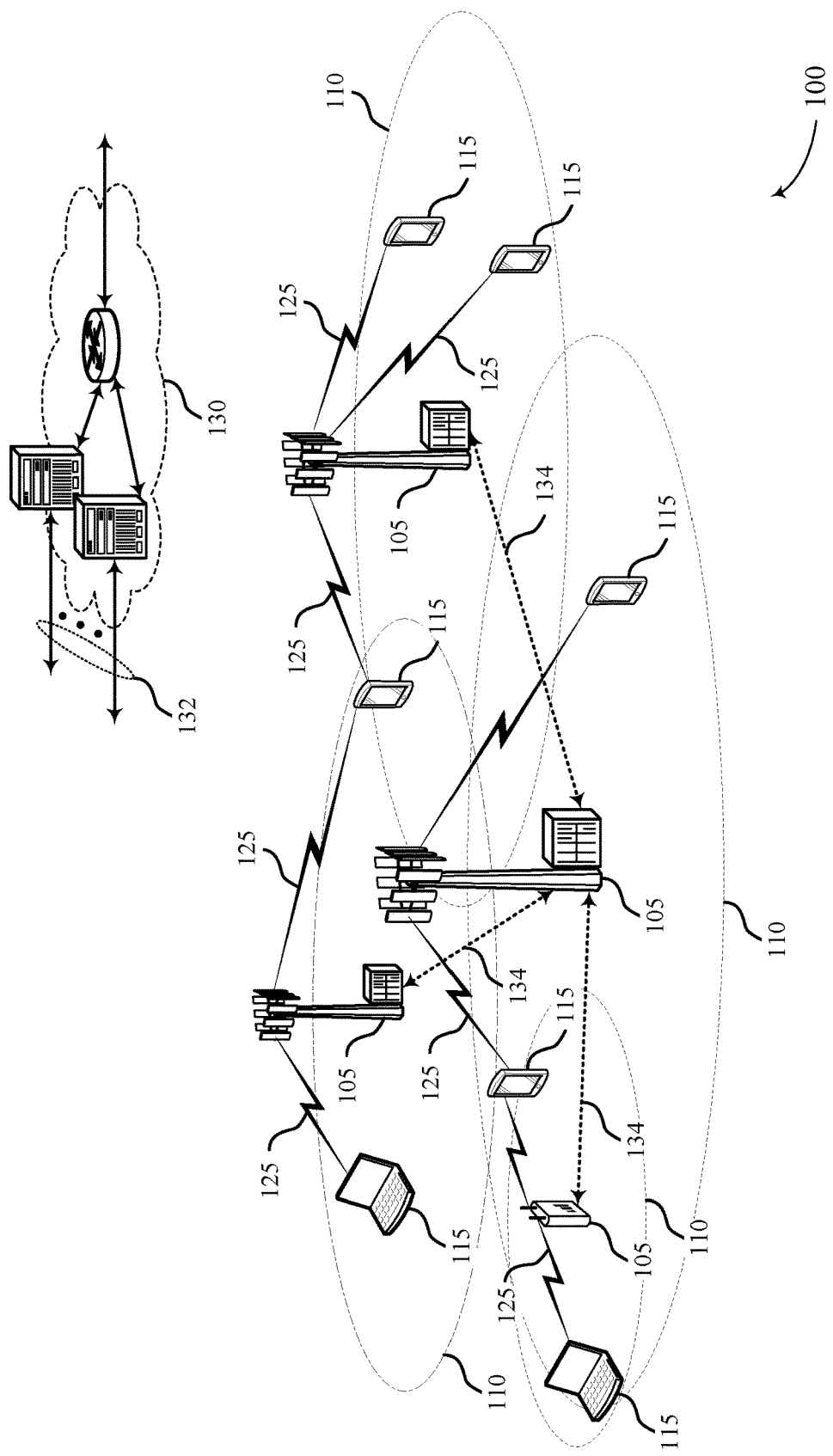
FIG. 1 illustrates a block diagram of a wireless communication system that supports beam management for various levels of beam correspondence in accordance with various aspects of the present disclosure.

Some examples of wireless communication systems support beam management for various levels of beam correspondence in accordance with various aspects of the present disclosure. For example, a downlink (DL) transmission, via one or more beams, from a transmitting wireless node (e.g., evolved nodeB (eNB)) may be used to identify a corresponding DL reception beam for a receiving wireless node (e.g., user equipment (UE)). The DL transmission beam and DL reception beam may be identified as a DL beam pair for the wireless nodes. Additionally, if a level of beam correspondence exists, the DL beam training information (e.g., beam pair) may be used to identify a beam pair for an uplink (UL).

Alternatively or additionally, an UL transmission, via one or more beams, from a transmitting wireless node (e.g., UE) may be used to identify an UL reception beam for a receiving wireless node (e.g., eNB). In some cases, if a level of beam correspondence between wireless nodes exists, the wireless nodes may avoid performing a beam sweep to identify an UL beam pair (i.e., transmission beam and reception beam). However, in some examples, the level of beam correspondence may be below a threshold and a wireless node may perform at least a partial beam sweep (e.g., of a plurality of beams, a subset of the plurality of beams, etc.) to identify a beam pair (i.e., a transmission/reception beam) for the wireless nodes.

In the absence of any level of beam correspondence, wireless nodes (e.g., eNB and UE) may perform a full beam sweep, i.e., to identify a pair of beams for DL or UL transmission. A full beam sweep may include a wireless node transmitting an UL or DL transmission via multiple beams to another wireless node, or sweeping through multiple beams in order to receive a transmission. A wireless node may also perform a partial beam sweep for UL or DL transmissions based on information associated with an UL beam or DL beam.

Alternatively, at the receiving wireless node, the wireless node may perform a partial beam sweep based on information provided in the signal of the base beam. In some examples, the information may include a beam ID. The wireless node may identify the base beam based on the beam ID. Based on identifying the base beam, the wireless node may perform beam training on a link (e.g., DL or UL) using the base beam and one or more neighboring beams. The wireless nodes may determine a beam pair based on analyzing information associated with the base and the neighboring beam. For example, a UE may receive information via a transmission beam from a base station. The UE may map the transmission beam to a corresponding reception beam associated with the UE. In some cases, the corresponding reception beam may be an inferior choice among other neighboring candidate reception beams of the UE. As a result, the UE may analyze parameters of neighboring candidate reception beams. The neighboring candidate reception beams may also receive the transmission beam. Some examples of parameters may include signal-to-noise ratio (SNR), among others.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates a block diagram of a wireless communication system 100 that supports beam management for various levels of beam correspondence in accordance with various aspects of the present disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., 51, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage area 110 for different technologies.

In some examples, the wireless communication system 100 is an Long-Term Evolution-Advanced (LTE/LTE-A) network. In LTE/LTE-A networks, the term eNB may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3rd Generation Partnership Project (3GPP) term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communication system 100 may include UL transmissions from a UE 115 to a base station 105, and/or DL transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

In some examples UE 115 may operate based on a discontinuous reception. The periodic switching off of a receiver, usually to save energy. In some cases, discontinuous reception (DRX) cycles can be configured in the LTE downlink so that the UE does not have to decode the Physical Downlink Control Channel (PDCCH) or receive Physical Downlink Shared Channel (PDSCH) transmissions in certain subframes. In some cases, a UE 115 may monitor a communication link 125 continuously for an indication that the UE 115 may receive data. In other cases (e.g., to conserve power and extend battery life) a UE 115 may be configured with a DRX cycle. A DRX cycle consists of an On Duration when the UE 115 may monitor for control information (e.g., on PDCCH) and a DRX period when the UE 115 may power down radio components. In some cases, a UE 115 may be configured with a short DRX cycle and a long DRX cycle.

In some cases, a UE 115 may enter a long DRX cycle if the UE 115 is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may resume a long DRX cycle.

In some examples, base station 105 or UE 115 may communicate one or more messages via a physical broadcast channel (PBCH). The LTE physical channel which carries the Master Information Block (MIB), consisting of a limited number of the most frequently transmitted parameters essential for initial access to the cell. The PBCH is designed for early detection by the UE, and cell-wide coverage.

In some examples, base station 105 or UE 115 may communicate one or more messages via RRC. The RRC protocol handles the Layer 3 control plane signaling by which the E-UTRAN controls the UE behavior. The RRC protocol supports the transfer of both common and dedicated Non-Access Stratum information. It covers a number of functional areas including System Information (SI) broadcasting, connection control including handover within LTE, network-controlled inter-Radio Access Technology (radio access technology (RAT)) mobility and measurement configuration and reporting.

In some examples, base station 105 or UE 115 may communicate one or more messages via a random access channel (RACH). A transport channel used for access to the network when the UE does not have accurate uplink timing synchronization, or when the UE does not have any allocated uplink transmission resource. The RACH is normally contention-based, which may result in collisions between UEs. After the UE 115 decodes system information block (SIB), it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit an RRC connection request, or RACH message 3, along with a temporary mobile subscriber identity (TMSI) (if the UE 115 has previously been connected to the same wireless network) or a random identifier.

The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In some examples, during a RACH procedure, UE 115 may transmit a RACH preamble to a base station 105. This may be known as RACH message 1. This may enable the base station 105 to distinguish between multiple UEs 115 trying to access the system simultaneously. The base station 105 may respond with a RAR, or RACH message 2, that provides an UL resource grant, a timing advance and a C-RNTI. The UE 115 may then transmit an RRC connection request, or RACH message 3, along with a TMSI (if the UE 115 has previously been connected to the same wireless network) or a random identifier.

The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

Wireless communication system 100 may operate in an ultra-high frequency (UHF) frequency region using frequency bands from 700 MHz to 2600 MHz (2.6 GHz), although in some cases wireless local area network (WLAN) networks may use frequencies as high as 4 GHz. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Specifically, wireless communication system 100 may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device, such as a UE 115, may select a beam direction for communicating with a network by selecting the strongest beam from among a number of signals transmitted by a base station 105. In one example, the signals may be DL signals transmitted from the base station 105 during discovery. The discovery procedure may be cell-specific, e.g., may be directed in incremental directions around the geographic coverage area 110 of the base station 105. The discovery procedure may be used, at least in certain aspects, to identify and select beam(s) to be used for beamformed transmissions between the base station 105 and a UE 115.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Wireless communication system 100 may be or include a multicarrier mmW wireless communication system. Broadly, aspects of wireless communication system 100 may include a UE 115 and a base station 105 configured to beam management for various levels of beam correspondence in accordance with various aspects of the present disclosure. For example, the base station 105 and/or UE 115 may perform a first beam sweep procedure to determine a first beam pair that includes a transmit beam of a first wireless node (e.g., UE 115 or base station 105) and a receive beam of a second wireless node (e.g., UE 115 or base station 105). In some cases, UE 115 or base station 105 may identify a level of correspondence at one or both of the first wireless node and the second wireless node, the level of correspondence being between a transmit beam and a receive beam of a respective wireless node. That is, UE 115 may be aware in advance its level of correspondence; for example, based on device (i.e., UE 115) calibration. In some cases, UE 115 or base station 105 may determine, based on the first beam pair, a level of correspondence at one or both of the first wireless node and the second wireless node. Additionally, UE 115 or base station 105 may determine, based on the level of correspondence, a range of a second beam sweep procedure to be performed in determining a second beam pair that includes a transmit beam of the second wireless node and a receive beam of the first wireless node.

Figure 2A:
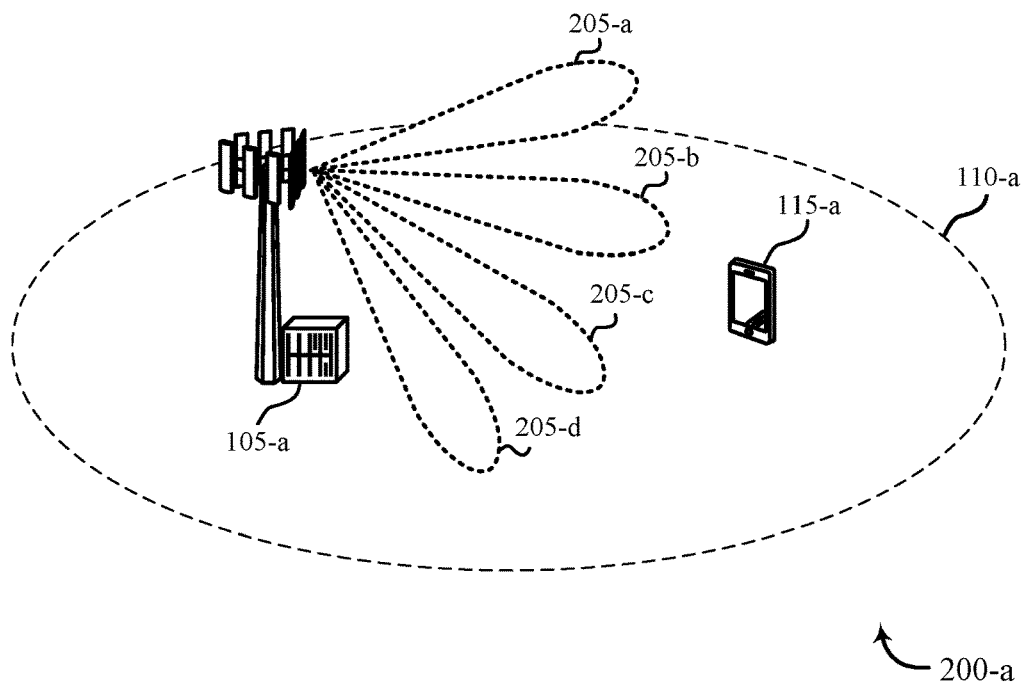
FIGS. 2A and 2B illustrate an example of a wireless communication system that supports beam management for various levels of beam correspondence in accordance with various aspects of the present disclosure.
Figure 2B:
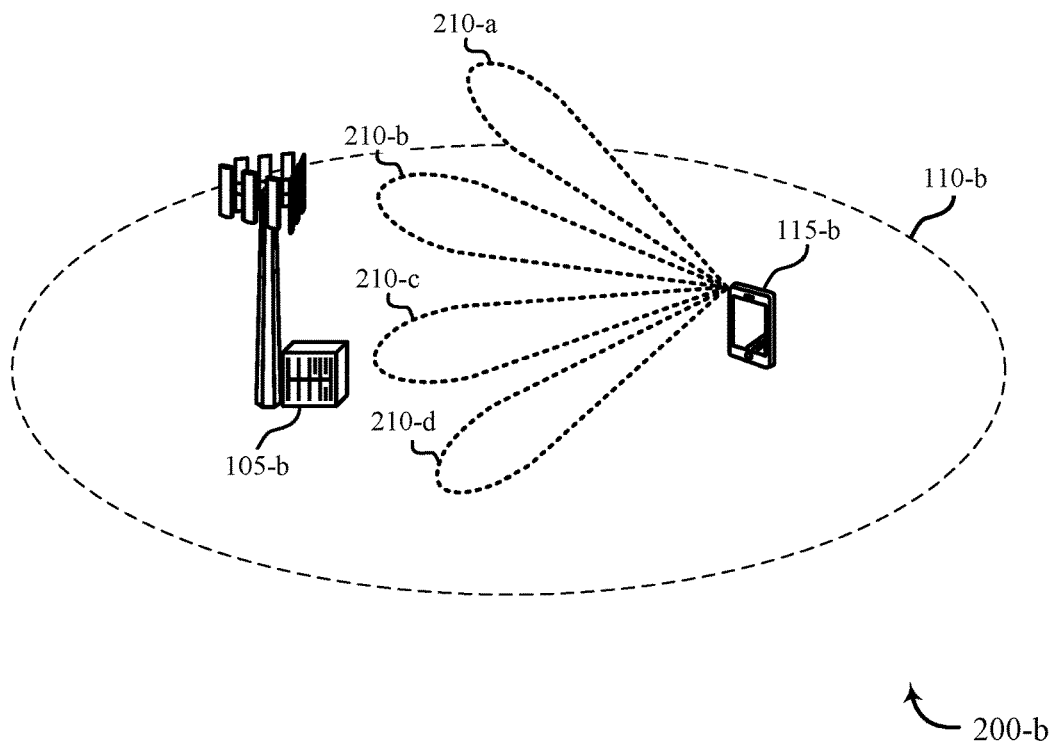

FIGS. 2A and 2B illustrate an example of a wireless communication system 200 that supports beam management for various levels of beam correspondence in accordance with various aspects of the present disclosure. FIG. 2A illustrates an example of a wireless communication system 200-*a* that supports beam management for various levels of beam correspondence in accordance with various aspects of the present disclosure. Wireless communication system 200-*a* may be an example of one or more aspects of wireless communication system 100 of FIG. 1. Some examples of wireless communication system 200-*a* may be a mmW wireless communication system. Wireless communication system 200-*a* may include UE 115-*a* and base station 105-*a*, which may be one or more aspects of UE 115 and base station 105 as described with reference to FIG. 1.

In some examples, wireless communication system 200-*a* may determine a level of beam correspondence based on one or more transmissions of signals between base station 105-*a* and UE 115-*a*. In some cases of wireless communication system 200-*a*, base station 105-*a*, or UE 115-*a*, or both may perform beam training based on received signals from the transmitting device (e.g., base station 105-*a* or UE 115-*a*). Base station 105-*a* may be a mmW base station that may transmit a beamformed transmission on an active beam to UE 115-*a*. A transmission from base station 105-*a* may be a beamformed or directional transmission directed towards UE 115-*a*. For example, base station 105-*a* may perform a beam sweep by transmitting signals to UE 115-*a* on DL transmission beams 205-*a* through 205-*d*.

Base station 105-*a* may transmit DL signals in a beamformed manner and sweep through the angular coverage region for a geographic coverage area 110-*a*. Each DL transmission beams 205-*a* through 205-*d* may be transmitted in a beam sweeping operation in different directions so as to cover the coverage area of base station 105-*a*. For example, DL transmission beam 205-*a* may be transmitted in a first direction, DL transmission beam 205-*b* may be transmitted in a second direction, DL transmission beam 205-*c* may be transmitted in a third direction, and DL transmission beam 205-*d* may be transmitted in a fourth direction. Although wireless communication system 200 illustrates four DL transmission beams, i.e., DL transmission beams 205-*a* through 205-*d*, it is to be understood that fewer and/or more DL transmission beams may be transmitted.

The DL transmission beams may additionally be transmitted at variable beam widths, at different elevation angles, etc. In some examples, DL transmission beams 205-*a* through 205-*d* may be associated with a beam index, e.g., an indicator identifying the DL transmission beam. UE 115-*a* may, in some examples, identify a DL reception beam based on the beam index received and associated with the DL transmission beam (e.g., DL transmission beam 205-*b*). In some examples, base station 105-*a* may determine an UL reception beam based on one or more received UL signals received from UE 115-*a*.

Base station 105-*a* may, additionally or alternatively, transmit DL transmission beams 205-*a* through 205-*d* during different symbol periods of a subframe. For example, base station 105-*a* may transmit DL transmission beam 205-*a* during a first symbol period (e.g., symbol 0), DL transmission beam 205-*b* during a second symbol period (e.g., symbol 1), DL transmission beam 205-*c* during a third symbol period (e.g., symbol 2), and DL transmission beam 205-*d* during a fourth symbol period (e.g., symbol 3). In some cases, base station 105-*a* may also transmit DL transmission beams 205-*a* through 205-*d* during other symbol periods of a subframe. In some cases, UE 115-*a* may identify a DL reception beam based on the symbol period of the subframe associated with the received DL transmission beam (e.g., DL transmission beam 205-*b*). UE 115-*a* may also transmit a report to base station 105-*a* indicating to base station the DL reception beam for UE 115-*a*.

In some examples, UE 115-*a* may determine a range associated with a beam sweep procedure based on a range associated with a beam sweep for base station 105-*a*. In some examples, the range may include multiple thresholds, for example, different levels of inner thresholds that determine a level of correspondence for a partial beam sweep. For instance, a range may have a first threshold (e.g., ratios of an amplitude and phase error of a transmit path and a receive path). The first threshold may include within it multiple sub-thresholds (e.g., received signal strength, channel/link quality, etc.). In one case, UE 115-*a* may determine a range for a beam sweep procedure equal to the beam sweep of base station 105-*a* based on the level of beam correspondence being below a lower threshold. UE 115-*a* may determine that no beam sweep is to be performed based on the level of beam correspondence beaning above an upper threshold. Alternatively, UE 115-*a* may determine to perform a partial beam sweep based on the level of beam correspondence being above the lower threshold and below the upper threshold.

In some cases, base station 105-*a* may perform beam sweeping to determine a location and direction of UE 115-*a*. The beam sweeping operation may improve communication between base station 105-*a* and UE 115-*a* when a level of correspondence does not hold between DL or UL channels. After base station 105-*a* performs beam sweeping (e.g., transmitting one or more signals via DL transmission beams 205-*a* through 205-*d*), base station 105-*a* may receive a response signal from UE 115-*a*. A response signal may include calibration values for calibrating a transmit path and receive path for UE 115-*a*. In one case, UE 115-*a* may determine a level of correspondence for an UL transmission beam or DL reception beam using the calibration values.

UE 115-*a* or base station 105-*a* may, additionally or alternatively, determine a range for a beam sweep procedure based on a range of calibration values associated with a transmit path and a receive path. UE 115-*a* may determine the range of the beam sweep procedure to be performed based on a range of beams straddling the transmit beam of the base station 105-*a* and the receive beam of UE 115-*a*. Or alternatively, base station 105-*a* may determine the range of the beam sweep procedure to be performed based on a range of beams straddling the transmit beam of the UE 115-*a* and the receive beam of base station 105-*a*. In some cases, base station 105-*a* or UE 115-*a* may determine the range of a second beam sweep procedure based on a difference of indices between the transmit beam and the receive beam of base station 105-*a* or UE 115-*a* and the receive beam of base station 105-*a* or UE 115-*a* for DL and UL.

Additionally, the range of calibration values includes at least one of a range of amplitude error of antenna weights, a range of phase error of the antenna weights, or combinations thereof. In some cases, the range of calibration values includes at least a difference between amplitude error of antenna weights associated with the transmit path and the receive path, a difference between phase error of antenna weights associated with the transmit path and the receive path, or combinations thereof. Base station 105-*a* or UE 115-*a*, in some cases, may determine an uncertainty for beam mapping based on difference between amplitude error of antenna weights and phase error of antenna weights.

In some examples of wireless communication system 200-*a*, base station 105-*a* and UE 115-*a* may include one or more antenna arrays. An antenna array may include one or more antenna elements. A DL transmission beam may be transmitted from base station 105-*a* to UE 115-*a*. Subsequent to the DL transmission, one or more antenna elements of UE 115-*a* may receive the DL transmission beam. Alternatively or additionally, an UL transmission beam may be transmitted from UE 115-*a* to base station 105-*a*. As a result, one or me antenna elements of base station 105-*a* may receive the UL transmission beam. In some examples, base station 105-*a* and/or UE 115-*a* may determine a level of beam non-correspondence. Determining a level of beam non-correspondence may include base station 105-*a* and UE 115-*a* computing calibration values. In some examples, computing calibration values may include calculating amplitude and phase error of transmit and receive signals (e.g., beams). For example, base station 105-*a* or UE 115-*a* may compute an array weight vector associated with an incoming signal (e.g., transmission beam). For example, assume that an antenna array has N elements. Base station 105-*a* or UE 115-*a* may compute a channel response based on the following equation:

$$h = 1 e^{-jkd(\sin\theta)} \ldots e^{-j(N-1)kd(\sin\theta)} \qquad (1)$$

where k is the wavenumber of the incoming signal (i.e., transmission beam), d is the spacing between the antenna elements of the antenna array, and θ is the angle of the incoming signal.

A transmit path associated with DL and UL signals in wireless communication system 200, may be subject to amplitude and phase error. Base station 105-*a* or UE 115-*a* may compute an array weight vector associated with amplitude and phase error of an incoming signal (e.g., transmission beam) based on the following equation:

$$w_{ideal} = \alpha_{0,tx} e^{j\delta_{0,tx}} \alpha_{1,tx} e^{-jkd(\sin\theta)+\delta_{1,tx}} \ldots \\ \alpha_{N-1,tx} e^{-j(N-1)kd(\sin\theta)+\delta_{(N-1),tx}} \qquad (2)$$

where $\alpha_{0,tx}$ is the amplitude error that may be a value within a range (e.g., 0.9 to 1.1), k is the wavenumber of the incoming signal (i.e., transmission beam), d is the spacing between the antenna elements of an antenna array, and θ is the angle of the incoming signal.

Additionally, $\delta_{0,tx}$ is the phase error term. In some cases, each antenna element of an antenna array may have different phase error terms. For example, a first phase error term may be related to a first antenna element and have a first value while a second phase error term may relate to a second antenna element and includes a second value different from the first value.

Additionally, in some cases, a receive path of DL and UL signals in wireless communication system 200-*a*, may be subject to amplitude and phase error. Base station 105-*a* or UE 115-a may compute an array weight vector associated with amplitude and phase error for a receive path signal based on the following equation:

$$w = \alpha_{0,rx} e^{j\delta_{0,rx}} \alpha_{1,rx} e^{-jkd(\sin\theta)+\delta_{1,rx}} \ldots \alpha_{N-1,rx} e^{-j(N-1)kd(\sin\theta)+\delta_{(N-1),rx}} \quad (3)$$

where $\alpha_{0,rx}$ is the amplitude error may be a value within a range of values, k is the wavenumber of the incoming signal, d is the spacing between the antenna elements of the antenna array, and θ is the angle of the incoming signal. Additionally, $\delta_{0,rx}$ is the phase error term at antenna elements 0, 1 ... N−1.

Phase error may, in some cases, shift a direction of one or more beams associated with base station 105-a or UE 115-a. Base station 105-a or UE 115-a may compute an array weight vector associated with phase distortion and angular shift for a transmit or receive path signal based on the following equation:

$$w_{dist,\mu} = \frac{e^{j\delta_0} e^{-jkd(\sin\theta+\mu)+\delta_1} \ldots e^{-j(N-1)kd(\sin\theta+\mu)+\delta_{(N-1)}}}{\sqrt{N}} \quad (4)$$

The phase error, in some examples, may be assumed to be uniformly distributed in a range. The range may be identified by a number of bits in a phase quantizer. For example, for a B bit phase quantizer, a phase error may be range uniformly between $-\pi/2^B$ to $+\pi/2^B$. The μ term denotes that angular shift for a corresponding beam (e.g., transmission beam or reception beam). In some examples, when μ is equal to zero, base station 105-a or UE 115-a may align a beam toward an angle of arrival at one or more of the antenna elements 0, 1 . . . N−1. Additionally or alternatively, when μ is equal to a number other than zero, base station 105-a or UE 115-a may align a beam by shifting the beam to the left or right relative to the angle of arrival axis. In some examples, base station 105-a or UE 115-a may be restricted from shifting a beam towards an angle of arrival, even when the angular shift term μ is equal to zero, based on presence of random phase error. As a result, there may be an absence of a level of beam correspondence for base station 105-a or UE 115-a.

Phase error may additionally affect neighboring beams associated with a base beam angled towards the angle of arrival. In some examples, due to randomness of phase error a neighboring beam (e.g., beam 205-a or beam 205-c) may have a greater array gain compared to the base beam (e.g., beam 205-b). Some examples of wireless communication system 200 may use a two-bit phase quantizer to mitigate an array gain of neighboring beams exceeding an array gain of the base beam, i.e., the beam intended to point to the angle of arrival. In some examples, if the phase error ranges between −45 degrees to +45 degrees, UE 115-a or base station 105-a may identify that a level of beam correspondence exists and beam training on the DL can be used to identify beam pairs in the UL.

Alternatively, some examples of wireless communication system 200 may use a one-bit phase quantizer to mitigate an array gain of neighboring beams exceeding an array gain of the base beam, i.e., the beam intended to point to the angle of arrival. For a one-bit phase quantizer, the phase error may be distributed randomly and uniformly between a range of −90 degrees to +90 degrees. In the presence of a large phase error, a gain of an antenna array element associated with a neighboring beam of base station 105-a may less likely exceed the gain of the antenna array element of the base beam (e.g., base beam 205-b) that may point towards a direction of UE 115-a.

Additionally, in the presence of large phase error, base station 105-a or UE 115-a may perform a partial beam sweep in the UL based on determining the range of beam sweep based on information obtained from DL. Base station 105-a or UE 115-a may transmit range of amplitude and phase error to each other, for example, in a header of a data packet. In some examples, base station 105-a may use a same beam to transmit a DL beam training signal and to receive an UL beam training signal from UE 115-a. Base station 105-a may compare the DL received signal strength of a DL transmit beam and the UL received signal strength of an UL receive beam to determine an existence or absence of beam correspondence.

In some cases, each antenna element of antenna array may include different phase error terms. Additionally, wireless communication system 200 may determine a level of beam correspondence based on a ratio of the amplitude and phase error associated with a transmit path and a receive path. In some examples, a level of beam correspondence may exists based on the ratios of the amplitude and phase error of the transmit path and the receive path being within a threshold range of each other.

UE 115-a or base station 105-a, in some cases, may determine that a partial beam sweep is to be performed based on a verification that a timer associated with the use of the level of correspondence has expired.

Additionally or alternatively, a received response signal from UE 115-a may be an indication to base station 105-a of a DL quality associated with the transmission of the DL beam used to transmit the DL signal to UE 115-a. In some examples, the indication may be a DL quality associated with a DL beam pair. For example, a DL beam pair may include a DL transmit beam (e.g., DL transmission beam 205-b) associated with base station 105-a and DL reception beam associated with UE 115-a. UE 115-a may determine a reference signal received power (RSRP) for a DL transmission associated with a DL transmission beam. In some cases, base station 105-a may receive an indication of the RSRP association with the DL transmission from UE 115-a.

Base station 105-a in some examples may determine an UL quality associated with an UL transmission beam from UE 115-a. In some examples, the UL quality may be based on a SNR of an UL beam pair. For example, an UL beam pair may include an UL transmit beam associated with UE 115-a and an UL reception beam associated with base station 105-a. Base station 105-a or UE 115-a may determine the SNR based on the UL transmit beam or UL receive beam. In some examples, base station 105-a or UE 115-a may determine a level of correspondence using the DL quality. Alternatively, base station 105-a or UE 115-a may determine the level of correspondence using the UL quality. In some cases, base station 105-a may transmit at a higher power level compared to UE 115-a. In some examples, a duration of an UL beam sweep may have a longer duration compared to a DL beam sweep. The duration of an UL beam sweep may be determined based on a link budget, i.e., a difference between transmit power between DL and UL.

Base station 105-a and UE 115-a may transmit messages using one or more physical channels or control channels. In one case, base station 105-a or UE 115-a, may transmit an indication identifying a level of correspondence to each other via a PBCH. In some cases, base station 105-a or UE 115-a, may transmit an indication identifying a level of correspondence to each other via a RACH message. For example, base station 105-a and UE 115-a may transmit the indication via msg1-msg4 of RACH. Alternatively, base station 105-a or UE 115-a, may transmit an indication identifying a level of correspondence to each other via physical uplink control channel (PUCCH). Base station 105-a or UE 115-a, in some cases may transmit an indication identifying a level of correspondence to each other via a RRC message.

In some examples, base station 105-a or UE 115-a may select a frequency region and/or a waveform configuration for transmitting random access signal (e.g., RACH message or msg1-msg4) based on an index of an identified DL signal of a DL transmission beam 205-a, 205-b, 205-c, or 205-d. During a random access period, base station 105-a may identify an UL transmission beam by receiving the random access signal in a sweeping manner. Base station 105-a may also identify the UE 115-a selected DL reception beam from the frequency resource and/or RACH waveform used (e.g., the used frequency region and/or waveform configuration) that includes the RACH message (e.g., msg1) of the random access signal.

In some examples, UE 115-a may receive one or more DL signals on one or more DL transmission beams 205-a through 205-d. The UE 115-a may identify a DL reception beam that satisfies a threshold, e.g., received signal strength threshold, channel/link quality threshold, etc. UE 115-a may identify a candidate DL reception beam based on a DL signal satisfying the threshold. As a result, UE 115-a may select a corresponding DL reception beam associated with the DL transmission beam. In some examples, UE 115-a may identify a frequency resource and/or RACH waveform to use for transmission of the RACH message based on the selected DL reception beam.

In one example, the frequency resource and/or RACH waveform used for the transmission of the RACH message may correspond to the symbol of the identified DL transmission beam. Alternatively, base station 105-a may identify a DL reception beam of UE 115-a from the used frequency region and/or RACH waveform that contains the message-1 of random access signal. Base station 105-a may determine an UL reception beam by measuring a quality of the received signal at different uplink receiver beams (e.g., DL beams 205-a through 205-d). The signal quality may denote one or more combinations of RSRP, or a received signal strength indication (RSSI), or a reference signal received quality (RSRQ), SNR, signal-to-interference-plus-noise ratio (SINR), etc. In some examples, UE 115-a may select a DL reception beam and selects the frequency region of RACH and/or RACH waveform based on the index of the DL transmission beam. UE 115-a may select a DL reception beam that satisfies a transmit power condition.

FIG. 2B illustrates an example of a wireless communication system 200-b that supports a level of beam correspondence, in accordance with aspects of the present disclosure. illustrates an example of a wireless communication system 200-b that supports beam management for various levels of beam correspondence in accordance with various aspects of the present disclosure. Wireless communication system 200-a may be an example of one or more aspects of wireless communication system 100 of FIG. 1. Some examples of wireless communication system 200-b may be a mmW wireless communication system. Wireless communication system 200-b may include UE 115-b and base station 105-b, which may be one or more aspects of UE 115 and base station 105 as described with reference to FIG. 1.

UE 115-b of wireless communication system 200-b may determine a level of beam correspondence based on one or more signals transmitted between base station 105-b and UE 115-b. In some cases of wireless communication system 200-b, UE 115-b may perform beam training based on received signals from base station 105-b. In some cases, beam training may include a full beam sweep, a partial beam sweep, or no beam sweep. A full beam sweep may include analyzing beams 210-a through 210-d. A partial beam sweep may include analyzing beams 210-b and neighboring beams 210-a and 210-c. Additionally, no beam sweep may occur when a level of beam correspondence exists where UE 115-b may not be required to analyze additional beams (e.g., beams 210-a or beams 210-c) to determine a DL reception beam or UL transmission beam. In some examples, UE 115-b may receive one or more DL signals from base station 105-b. In some cases, a transmissions from UE 115-b may be a beamformed or directional transmission directed towards base station 105-b.

In some examples of wireless communication system 200-b, beams 210-a through 210-d may be one or more aspects of beams 205-a through 205-d as described with reference to FIG. 2. In some cases, beams 210-a through 210-d may be one or more aspects of DL reception beams. UE 115-b may determine a DL reception beam based on a DL signal received from base station 105-b. UE 115-b may determine a level of beam correspondence based on the received DL transmission signal. In some cases, the received DL transmission signal may be associated with an individual DL transmission beam (e.g., DL transmission beams 205-a through 205-d as described with reference to FIG. 2). For example, UE 115-b may determine that at least one of beam 210-a, beam 210-b, beam 210-c, or beam 210-d may be a beam pair, i.e., DL reception beam for the DL transmission beam.

Alternatively, beams 210-a through 210-d may be one or more aspects of an UL transmission beam. For example, UE 115-b may transmit an UL signal via one or more UL transmission beams (e.g., UL transmission beams 210-a through 210-d) to base station 105-b. UE 115-b may transmit UL signal in a beamformed manner and sweep through an angular coverage region for a geographic coverage area 110-b. Each UL transmission beam 210-a through 210-d may be transmitted in a beam sweeping operation in different directions. For example, UL transmission beam 210-a may be transmitted in a first direction, UL transmission beam 210-b may be transmitted in a second direction, UL transmission beam 210-c may be transmitted in a third direction, and UL transmission beam 210-d may be transmitted in a fourth direction. Although wireless communication system 200-b illustrates four UL transmission beams, i.e., UL transmission beams 210-a through 210-d, it is to be understood that fewer and/or more UL transmission beams may be transmitted.

The UL transmission beams may alternatively be transmitted at different beam widths, at variable elevation angles, etc. In some cases, beams 210-a through 210-d may be associated with a beam index, e.g., an indicator identifying the UL transmission beam. Base station 105-b may, in some examples, identify an UL reception beam based on the beam index received and associated with the UL transmission beam (e.g., UL transmission beam 210-b).

In some examples, UE 115-b may transmit a UL transmission beams during different symbol periods of a subframe. For example, UE 115-b may transmit a first UL transmission beam during a first symbol period (e.g., symbol 0), a second UL transmission beam during a second symbol period (e.g., symbol 1), etc. In some cases, UE 115-b may also transmit UL transmission beams during other symbol periods of a subframe. In some cases, base station 105-*b* may identify an UL reception beam based on the symbol period of the subframe associated with the received UL transmission beam. Base station 105-*b* may in some examples transmit a response (e.g., confirmation) signal to UE 115-*b*. Base station 105-*b* may include calibration values for calibrating a transmit path or receive path for UE 115-*b*. Calibration values may include a range of amplitude error of antenna weights associated with the transmit path and the receive path, or a range of phase error of antenna weights associated with the transmit path and the receive path, or a combination thereof as described with reference to FIG. 2.

Base station 105-*b* in some examples may determine an UL quality associated with an UL transmission beam from UE 115-*a*. In some examples, the UL quality may be based on a SNR of an UL beam pair. For example, an UL beam pair may include an UL transmit beam associated with UE 115-*b* and an UL reception beam associated with base station 105-*b*. Base station 105-*b* or UE 115-*b* may determine the SNR based on the UL transmit beam or UL receive beam. In some examples, base station 105-*b* or UE 115-*b* may determine a level of correspondence using the DL quality. Alternatively, base station 105-*b* or UE 115-*b* may determine the level of correspondence using the UL quality.

Base station 105-*b* may include an indication in the response signal to UE 115-*b* of an UL quality associated with the UL transmission beam. In some cases, UE 115-*b* may transmit an indication of the RSRP of a DL reception to base station 105-*b*. Base station 105-*b* may determine an UL quality associated with an UL transmission beam from UE 115-*b*. In some examples, the UL quality may be based on SNR of an UL beam pair. For example, an UL beam pair may include an UL transmit beam (e.g., UL transmission beam 210-*a*) associated with UE 115-*b* and an UL reception beam associated with base station 105-*b* (not shown). Base station 105-*b* or UE 115-*b* may determine the SNR based on the UL transmit beam or UL receive beam. In some examples, base station 105-*b* or UE 115-*b* may determine the level of correspondence using the UL quality.

In the presence of complete random phase error, base station 105-*b* or UE 115-*b* may be precluded from attaining a full array gain. As a result, wireless communication system 200-*b* may employ base station 105-*b* or UE 115-*b* to calibrate. Some examples of wireless communication system 200-*b* may include calibrating one or more receiver chain components associated with base station 105-*b* or UE 115-*b*. Calibrating one or more receiver chain components of base station 105-*b* or UE 115-*b* may be based on using an external component with base station 105-*b* or UE 115-*b*. For example, an external component (not shown) may generate an external reference signal of known amplitude and phase. The external reference signal may be transmitted to base station 105-*b* or UE 115-*b*. In some examples, the external component may monitor and perform receiver measurements to estimate a gain and a phase error associated with the signal. Alternatively, calibrating one or more receiver chain components of base station 105-*b* or UE 115-*b* may be based on using one or more hardware components, e.g., couplers at antenna ports to tap a portion of a transmit signal and inject back into a receive path of base station 105-*b* or UE 115-*b*. A reference signal generated in a transmit baseband may be looped back through the coupled path back to the receiver baseband to calibrate an overall transmit and receive chain.

Additionally or alternatively, calibrating one or more receiver chain components of base station 105-*b* or UE 115-*b* may be based on generating a reference signal using an existing transmit chain and measuring a received signal using one or more receive chains. For example, base station 105-*b* or UE 115-*b* may generate a reference signal using an existing transmit chain of base station 105-*b* or UE 115-*b* and measure a received signal using a receive chain of base station 105-*b* or UE 115-*b*.

UE 115-*b* or base station 105-*b* may perform self-calibration based on mutual coupling among antenna array elements. For example, antenna array elements may be used to measure a phase and/or amplitude differences between each other based on transmitting from on antenna array element and receiving at another antenna array element. For example, UE 115-*b* or base station 105-*b* may transmit from a first antenna array element a signal having a first phase. At a second antenna array element of UE 115-*b* or base station 105-*b*, UE 115-*b* or base station 105-*b* may measure and compute a difference of the received first phase at the second antenna array element. Additionally, UE 115-*b* or base station 105-*b* may transmit a second signal having a second phase from a third antenna array element, and measure a difference of the second phase of the received second signal at the second antenna array element. UE 115-*b* or base station 105-*b* may align the first, second, and third antenna array element based on dynamically adjusting the second phase of the second signal until it matches the first phase of the first signal. UE 115-*b* or base station 105-*b* self-calibration may be performed in the field or in the factory (as part of a method to set a default level of beam correspondence for the UE 115-*b* or base station 105-*b*).

In some cases, UE 115-*b* or base station 105-*b* may simultaneously transmit with one antenna array element and receive at another antenna array element. The mutual coupling, in some examples, among the elements may be same and the mutual coupling amplitudes may be within a dynamic range.

In some cases, UE 115-*b* or base station 105-*b* may perform gain calibration based on generating a signal with high gain fidelity on a transmit chain. In some examples, UE 115-*b* may transmit at a high signal level based on UE 115-*b* being within a region where output power may be consistent across temperature and process variations. In some examples, base station 105-*b* may experience interference based on UE 115-*b* transmitting at a high signal level. UE 115-*b* may coordinate its calibration with base station 105-*b* to mitigate interference between UE 115-*b* and base station 105-*b*. For example, during calibration UE 115-*b* may avoid beamforming in a direction towards base station 105-*b*.

UE 115-*b*, in some examples, may avoid beamforming in a direction towards base station 105-*b* based on one or more transmit antenna elements actively transmitting. Additionally or alternatively, UE 115-*b* may avoid beamforming in a direction towards base station 105-*b* to ensure a strength associated with coupling an adjacent receive chain satisfies a predetermined threshold. In some examples, transmitting self-calibration TX signal has the potential to cause interference over a wider spatial area in a vicinity of UE 115-*b*, requiring the need for coordination with NB. Base station 105-*b* may allow system-wise or cluster-wise resource blanking so that UE 115-*b* may self-calibrate. Base station 105-*b* may additionally determine the resource blanking based on an indication from UE 115-*b* indicating an absence of a level of beam correspondence. In some cases, UE 115-*b* may transmit resource grant requests to base station 105-*b* for self-calibrating.

In some examples, UE 115-*b* may transmit an indication identifying a level of correspondence to base station 105-*b* via a PBCH. In some cases, UE 115-*b* may transmit an indication identifying a level of correspondence to each other via a RACH message. For example, base station **105-*b* and UE 115-*b* may transmit the indication via msg1-msg4 of RACH. Alternatively, UE 115-*b* may transmit an indication identifying a level of correspondence to base station 105-*b* via PUCCH. UE 115-*b*** in some cases may transmit an indication identifying a level of correspondence to each other via a RRC message.

In some examples, UE **115-*b* may receive one or more DL signals on one or more DL transmission beams. The UE 115-*b* may identify a DL reception beam that satisfies a threshold, e.g., received signal strength threshold, channel/ link quality threshold, etc. UE 115-*b* may identify a candidate DL reception beam based on a DL signal satisfying the threshold. As a result, UE 115-*b*** may select a corresponding DL reception beam associated with the DL transmission beam.

UE **115-*b* may determine a range of beam sweep based on the level of beam correspondence or a state of UE 115-*b*, or a combination thereof. A state may include a DRX mode, for example, a short DRX cycle or a long DRX cycle. In some examples, UE 115-*b* may perform a full beam sweep or a partial beam sweep based on short DRX cycles. Alternatively, UE 115-*b*** may perform no beam sweep based on a long DRX cycles.

Figure 3:
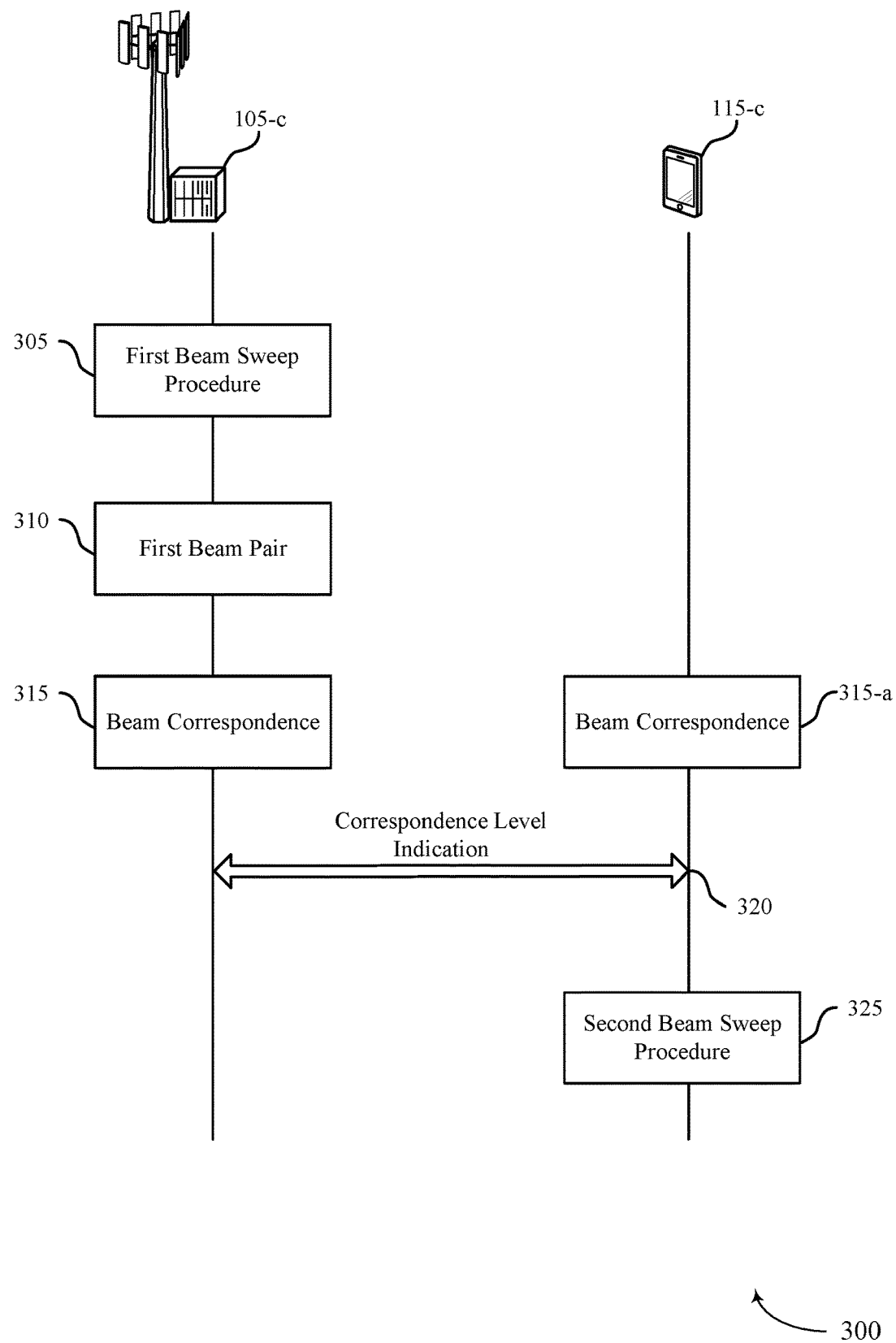
FIG. 3 illustrates an example of a process flow that supports beam management for various levels of beam correspondence in accordance with various aspects of the present disclosure.

FIG. 3 illustrates an example of a process flow 300 that supports beam management for various levels of beam correspondence in accordance with various aspects of the present disclosure. Process flow 300 may implement aspects of wireless communication system 100 or 200 as described with reference to FIG. 1 or 2. Process flow 300 may include base station **105-*b* and UE 115-*b*, which may be examples of the corresponding devices of FIGS. 1 through 3. Base station 105-*b*** may be a mmW base station.

At 305, base station **105-*c* may perform a first beam sweep procedure. At 310, base station 105-*c* may determine a first beam pair that includes a transmit beam of base station 105-*c* and a receive beam of UE 115-*c***. In some examples, the first beam sweep procedure is based at least in part on a synchronization signal transmission procedure, or a beam reference signal, or a beam refinement reference signal, or a channel state information reference signal (CSI-RS), or a mobility reference signal procedure, or a combination thereof.

At 315, base station **105-*c* may identify a level of correspondence. Alternatively, at 315-*a* UE 115-*c* may identify a level of correspondence. That is, UE 115-*c* may be aware in advance its level of correspondence; for example, based on device (i.e., UE 115-*c*) calibration. In some cases, UE 115-*c* or base station 105-*c* may determine, based on the first beam pair, a level of correspondence at one or both of the base station 105-*c* and UE 115-*c***.

At 320, base station **105-*c* and UE 115-*c* may transmit a correspondence level indication associated with DL beams associated with base station 105-*c* or UL beams associated with UE 115-*c*. In some cases, base station 105-*c* or UE 115-*c* may include the correspondence level indication in a MIB (e.g., bits reserved for indicating correspondence) or a SIB (e.g., bits reserved for indicating correspondence) transmitted to UE 115-*c* or base station 105-*c*. In some examples, the base station 105-*c* or UE 115-*c* may transmit the MIB over a PBCH, and the base station 105-*c* or UE 115-*c*** may transmit the SIB over an extended PBCH.

At 325, UE **115-*c* may determine, based on the level of correspondence, a range for a second beam sweep procedure. The second beam sweep procedure may be based on a RACH, or a sounding reference signal (SRS), or a demodulation reference signal (DMRS) transmission procedure or a combination thereof. For example, for aperiodic SRS transmission, UE 115-*c* may be configured to transmit a number of SRS resources for UL beam management. In some cases, the second beam sweep procedure may be performed to determine a second beam pair that includes a transmit beam of UE 115-*c* and a receive beam of base station 105-*c***. The determined range for the second beam sweep procedure may include a range of zero (e.g., no range), a complete or full range (such as the range used during the first beam sweep procedure), or a range that is in between zero and a full range (e.g., such as the range used for a partial beam sweep procedure).

Figure 4:
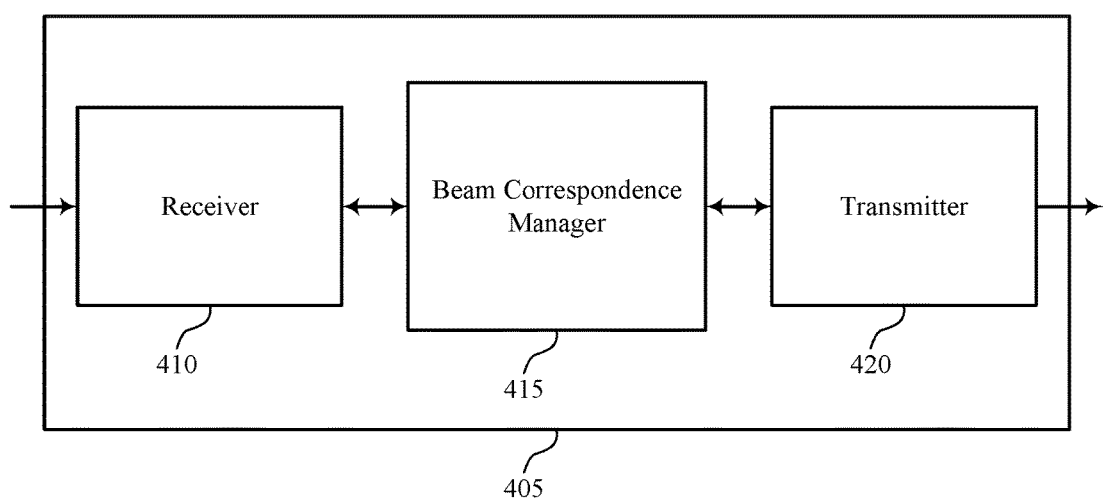
FIG. 4 illustrates a block diagram of a wireless device that that supports beam management for various levels of beam correspondence in accordance with various aspects of the present disclosure.

FIG. 4 illustrates a block diagram 400 of a wireless device 405 that that supports beam management for various levels of beam correspondence in accordance with various aspects of the present disclosure. Wireless device 405 may be an example of aspects of a UE 115 or base station 105 as described with reference to FIG. 1. Wireless device 405 may include receiver 410, beam correspondence manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to beam management in the presence of full/partial/no beam correspondence, etc.). Information may be passed on to other components of the device.

Beam correspondence manager 415 may perform a first beam sweep procedure to determine a first beam pair that includes a transmit beam of a first wireless node and a receive beam of a second wireless node, determine, based on the first beam pair, a level of correspondence at one or both of the first wireless node and the second wireless node, the level of correspondence being between a transmit beam and a receive beam of a respective wireless node, and determine, based on the level of correspondence, a range of a second beam sweep procedure to be performed in determining a second beam pair that includes a transmit beam of the second wireless node and a receive beam of the first wireless node. In some examples, the first beam sweep procedure is based on a synchronization signal transmission procedure, or a beam reference signal, or a beam refinement reference signal, or a channel state information reference signal (CSI-RS), or a mobility reference signal procedure, or a combination thereof.

Transmitter 420 may transmit signals generated by other components of the device. In some examples, the transmitter 420 may be collocated with a receiver 410 in a transceiver module. The transmitter 420 may include a single antenna, or it may include a set of antennas.

Figure 5:
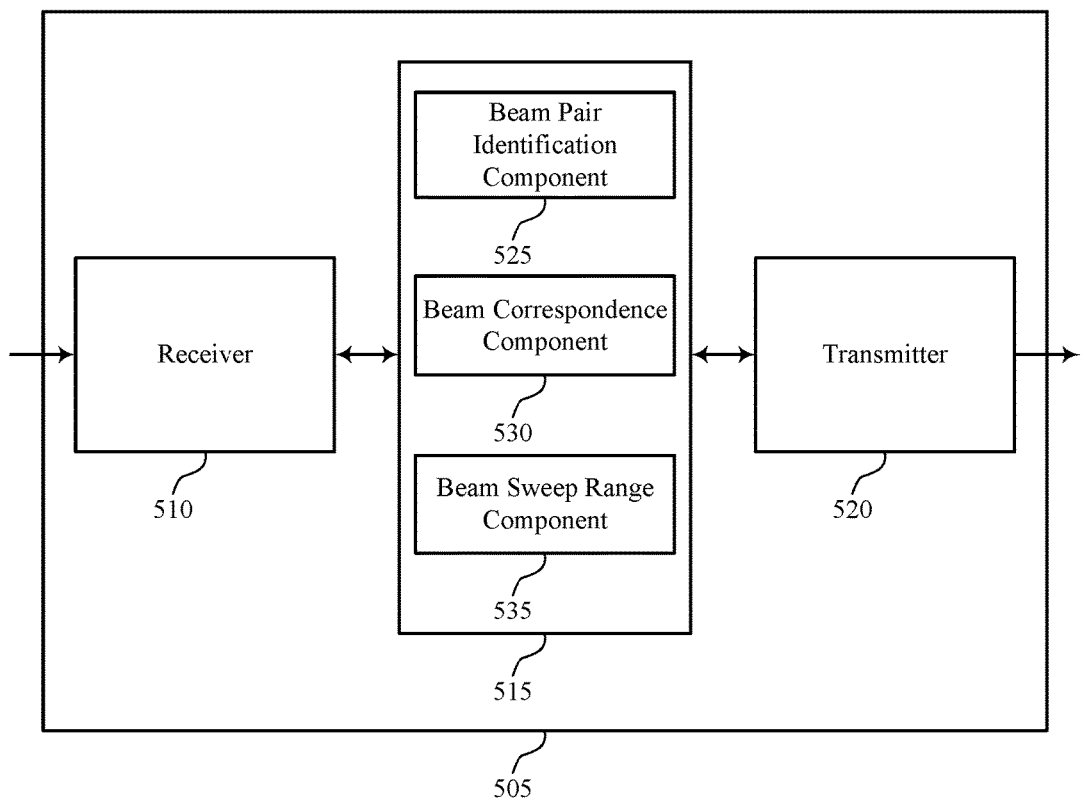
FIG. 5 illustrates a block diagram of a wireless device that supports beam management for various levels of beam correspondence in accordance with various aspects of the present disclosure.

FIG. 5 illustrates a block diagram 500 of a wireless device 505 that supports beam management for various levels of beam correspondence in accordance with various aspects of the present disclosure. Wireless device 505 may be an example of aspects of a wireless device 405 or a UE 115 or base station 105 as described with reference to FIGS. 1 and 4. Wireless device 505 may include receiver 510, beam correspondence manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to beam management in the presence of full/partial/no beam correspondence, etc.). Information may be passed on to other components of the device. The receiver 510 may be an example of aspects of the receiver 410 described with reference to FIG. 4.

Beam correspondence manager 515 may be an example of aspects of the beam correspondence manager 415 described with reference to FIG. 4. Beam correspondence manager 515 may also include beam pair identification component 525, beam correspondence component 530, and beam sweep range component 535.

Beam pair identification component 525 may perform a first beam sweep procedure to determine a first beam pair that includes a transmit beam of a first wireless node and a receive beam of a second wireless node.

Beam correspondence component 530 may determine, based on the first beam pair, a level of correspondence at one or both of the first wireless node and the second wireless node, the level of correspondence being between a transmit beam and a receive beam of a respective wireless node. In some cases, the second beam sweep is limited to a beam sweep at only one of the first wireless node or the second wireless node when the level of correspondence at the other of the first wireless node or the second wireless node is above an upper threshold. In some cases, determining the level of correspondence at one or both of the first wireless node and the second wireless node includes: receiving one or more signals from which the level of correspondence is determined.

Beam sweep range component 535 may determine, based on the level of correspondence, a range of a second beam sweep procedure to be performed in determining a second beam pair that includes a transmit beam of the second wireless node and a receive beam of the first wireless node. In some examples, the range may include multiple thresholds, for example, different levels of inner thresholds that determine a level of correspondence for a partial beam sweep. For instance, a range may have a first threshold (e.g., ratios of an amplitude and phase error of a transmit path and a receive path). The first threshold may include within it multiple sub-thresholds (e.g., received signal strength, channel/link quality, etc.). In some examples, beam sweep range component 535 may determine the range of the second beam sweep procedure to be performed based on a range of calibration values associated with a transmit path and a receive path of the at least one of the first wireless node or the second wireless node. In some cases, the calibration values may indicate an amplitude and phase error of the transmit path and the receive path of base station 105 or UE 115.

In some examples, beam sweep range component 535 may determine the range of the second beam sweep procedure to be performed based on a range of beams that includes either the transmit beam of the first wireless node or the receive beam of the second wireless node of the first beam pair. Beam sweep range component 535, in some cases, may determine that the partial second beam sweep is to be performed is further based on whether the second wireless node is participating in an initial access with the first wireless node. Additionally or alternatively, beam sweep range component 535 may determine that the partial second beam sweep is to be performed is further based on whether the second wireless node is awaking in connected mode from a DRX cycle whose duration exceeds a threshold.

In some cases, beam sweep range component 535 may determine that the partial second beam sweep is to be performed is further based on whether the second wireless node is in an inactive state. In some cases, determining the range of the second beam sweep procedure to be performed in determining the second beam pair includes: determining that the range of the second beam sweep procedure is equal to a range of the first beam sweep procedure based on the level of correspondence being below a lower threshold.

In some cases, determining the range of the second beam sweep procedure to be performed in determining the second beam pair includes: determining that no second beam sweep is to be performed based on the level of correspondence being above an upper threshold. In some cases, determining the range of the second beam sweep procedure to be performed in determining the second beam pair includes: determining that a partial second beam sweep is to be performed based on the level of correspondence being above a lower threshold and below an upper threshold. In some cases, the first beam sweep procedure is part of a synchronization signal transmission procedure.

Transmitter 520 may transmit signals generated by other components of the device. In some examples, the transmitter 520 may be collocated with a receiver 510 in a transceiver module. The transmitter 520 may include a single antenna, or it may include a set of antennas.

Figure 6:
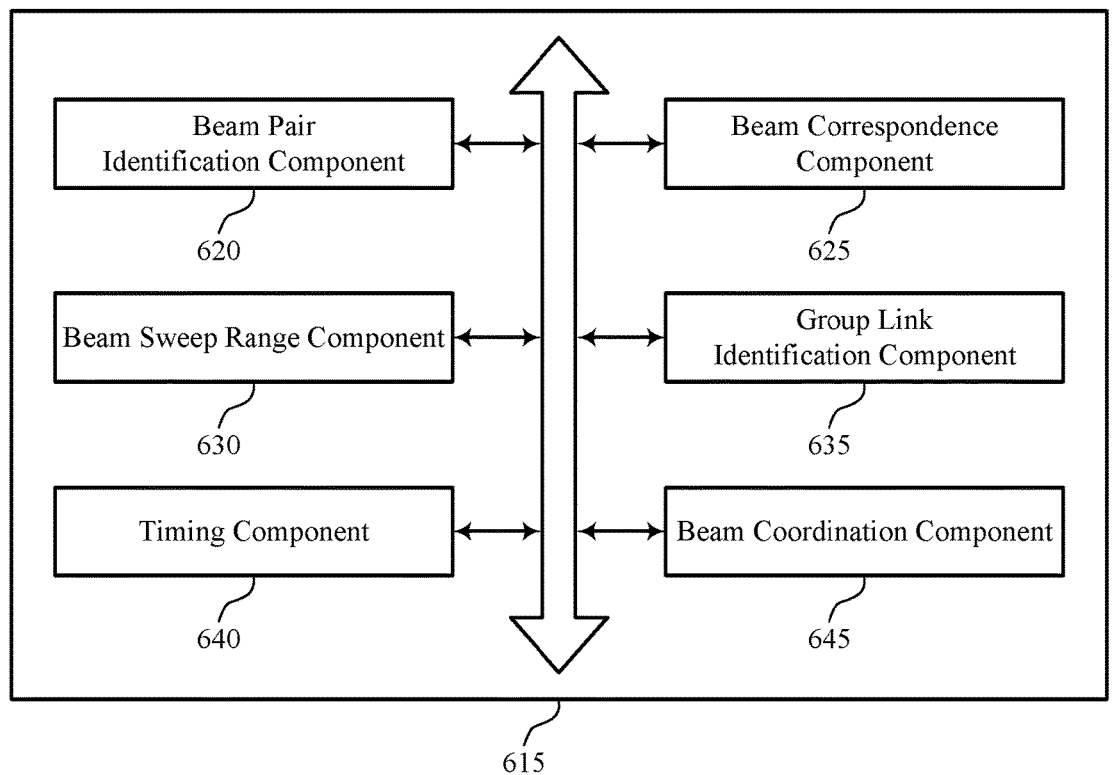
FIG. 6 illustrates a block diagram of a beam correspondence manager that supports beam management for various levels of beam correspondence in accordance with various aspects of the present disclosure.

FIG. 6 illustrates a block diagram 600 of a beam correspondence manager 615 that supports beam management for various levels of beam correspondence in accordance with various aspects of the present disclosure. The beam correspondence manager 615 may be an example of aspects of a beam correspondence manager 415 or beam correspondence manager 515 described with reference to FIGS. 4 and 5. The beam correspondence manager 615 may include beam pair identification component 620, beam correspondence component 625, beam sweep range component 630, group link identification component 635, timing component 640, and beam coordination component 645. Each of these modules may communicate, directly or indirectly, with one another (e.g., via one or more buses).

Beam pair identification component 620 may perform a first beam sweep procedure to determine a first beam pair that includes a transmit beam of a first wireless node and a receive beam of a second wireless node.

Beam correspondence component 625 may determine, based on the first beam pair, a level of correspondence at one or both of the first wireless node and the second wireless node, the level of correspondence being between a transmit beam and a receive beam of a respective wireless node. In some cases, the second beam sweep is limited to a beam sweep at only one of the first wireless node or the second wireless node when the level of correspondence at the other of the first wireless node or the second wireless node is above an upper threshold. In some cases, determining the level of correspondence at one or both of the first wireless node and the second wireless node includes: receiving one or more signals from which the level of correspondence is determined.

Beam sweep range component 630 may determine, based on the level of correspondence, a range of a second beam sweep procedure to be performed in determining a second beam pair that includes a transmit beam of the second wireless node and a receive beam of the first wireless node. In some examples, beam sweep range component 630 may determine the range of the second beam sweep procedure to be performed based on a range of calibration values associated with a transmit path and a receive path of the at least one of the first wireless node or the second wireless node.

In some examples, beam sweep range component 630 may determine the range of the second beam sweep procedure to be performed based on a range of beams that includes either the transmit beam of the first wireless node or the receive beam of the second wireless node of the first beam pair. In some cases, determining that the partial second beam sweep is to be performed is further based on whether the second wireless node is participating in an initial access with the first wireless node. Additionally or alternatively, determining that the partial second beam sweep is to be performed is further based on whether the second wireless node is awaking in connected mode from a DRX cycle whose duration exceeds a threshold. In some examples, determining that the partial second beam sweep is to be performed is further based on whether the second wireless node is in an inactive state.

In some cases, determining the range of the second beam sweep procedure to be performed in determining the second beam pair includes: determining that the range of the second beam sweep procedure is equal to a range of the first beam sweep procedure based on the level of correspondence being below a lower threshold. In some cases, determining the range of the second beam sweep procedure to be performed in determining the second beam pair includes: determining that no second beam sweep is to be performed based on the level of correspondence being above an upper threshold.

In some cases, determining the range of the second beam sweep procedure to be performed in determining the second beam pair includes: determining that a partial second beam sweep is to be performed based on the level of correspondence being above a lower threshold and below an upper threshold. In some cases, the first beam sweep procedure is part of a synchronization signal transmission procedure.

Group link identification component 635 may determine that the partial second beam sweep is to be performed is further based on an identification of a group of one or more links which share a same partial second beam sweep, identify the group of one or more links through communications between the first wireless node and the second wireless node, and reset the group of one or more links as part of a radio link failure (RLF) or handover procedure. In some cases, the group of one or more links are associated with the first wireless node.

Timing component 640 may determine that the partial second beam sweep is to be performed is further based on a verification that a timer associated with the use of the level of correspondence has expired and select a transmission time of a RACH signal based on the level of correspondence.

Beam coordination component 645 may enable beam coordination between the first wireless node and one or more other wireless nodes when a level of correspondence at either the first wireless node or the second wireless node is less than an upper threshold. In some cases, the beam coordination includes identification of beams to be reserved as downlink beams and identification of beams to be reserved as uplink beams.

Figure 7:
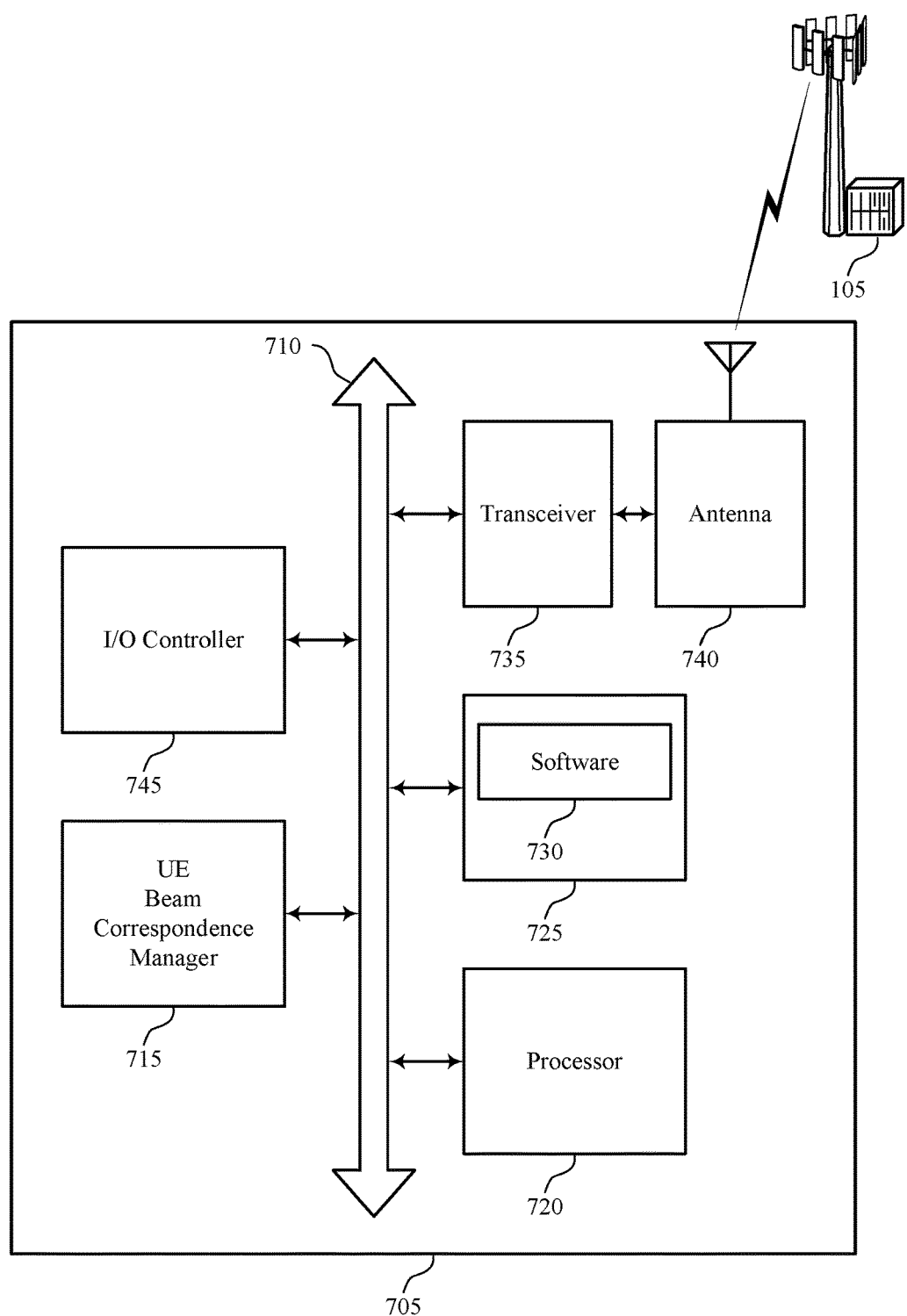
FIG. 7 illustrates a diagram of a system including a device that supports beam management for various levels of beam correspondence in accordance with various aspects of the present disclosure.

FIG. 7 illustrates a diagram of a system 700 including a device 705 that supports beam management for various levels of beam correspondence in accordance with various aspects of the present disclosure. Device 705 may be an example of or include the components of wireless device 405, wireless device 505, or a UE 115 as described above, e.g., with reference to FIGS. 1, 4 and 5. Device 705 may include components for bidirectional voice and data communications including components for transmitting and receiving communications, including UE beam correspondence manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting beam management in the presence of full/partial/no beam correspondence).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support beam management in the presence of full/partial/no beam correspondence. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
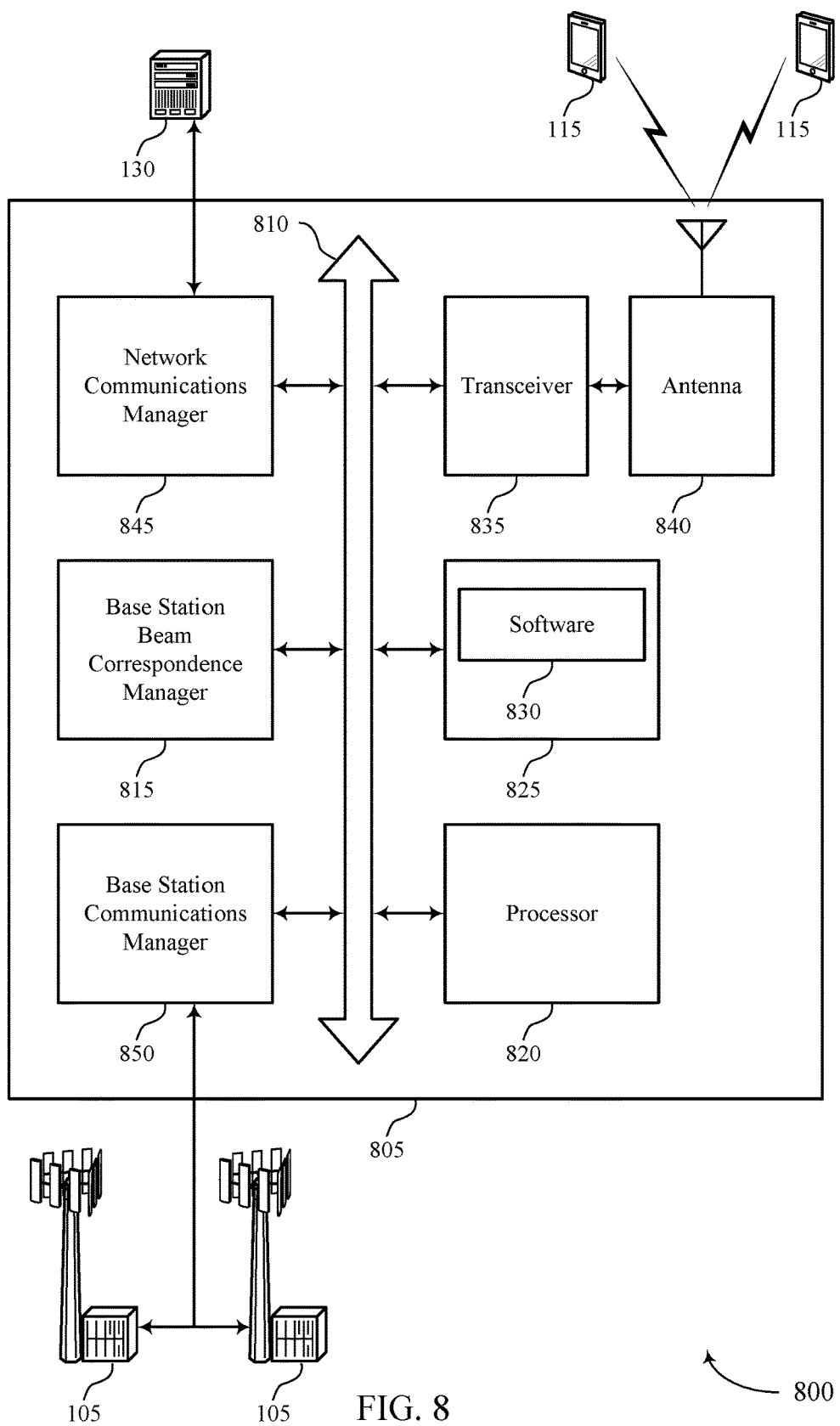
FIG. 8 illustrates a diagram of a system including a device that supports beam management for various levels of beam correspondence in accordance with various aspects of the present disclosure.

FIG. 8 illustrates a diagram of a system 800 including a device 805 that supports beam management for various levels of beam correspondence in accordance with various aspects of the present disclosure. Device 805 may be an example of or include the components of wireless device 405, wireless device 505, or a base station 105 as described above, e.g., with reference to FIGS. 1, 4 and 5. Device 805 may include components for bidirectional voice and data communications including components for transmitting and receiving communications, including base station beam correspondence manager 815, processor 820, memory 825, software 830, transceiver 835, antenna 840, network communications manager 845, and base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting beam management in the presence of full/partial/no beam correspondence).

Memory 825 may include RAM and ROM. The memory 825 may store computer-readable, computer-executable software 830 including instructions that, when executed, cause the processor to perform various functions described herein. In some cases, the memory 825 may contain, among other things, a BIOS which may control basic hardware and/or software operation such as the interaction with peripheral components or devices.

Software 830 may include code to implement aspects of the present disclosure, including code to support beam management in the presence of full/partial/no beam correspondence. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an Long Term Evolution (LTE)/LTE-A wireless communication network technology to provide communication between base stations 105.

Figure 9:
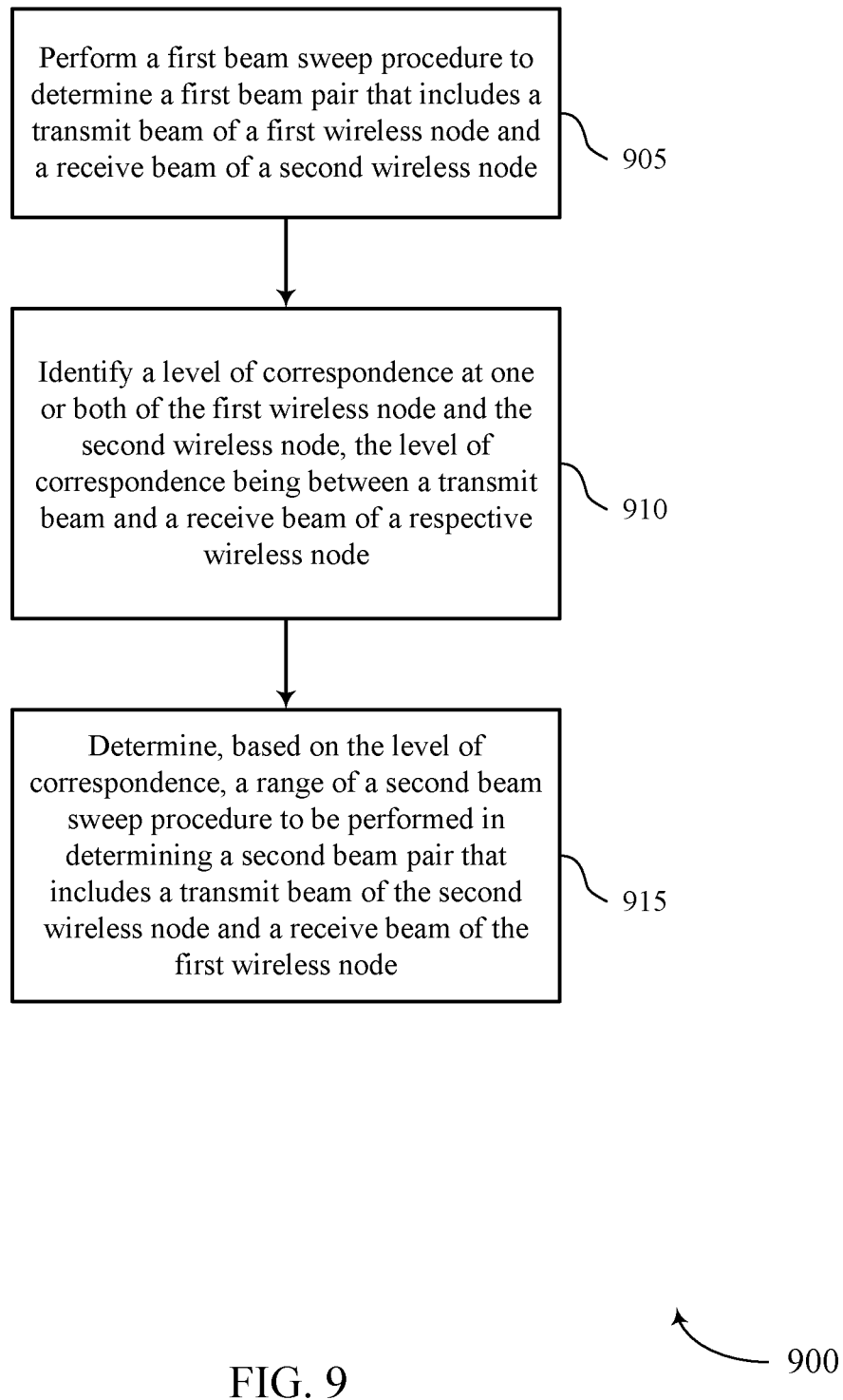
FIG. 9 illustrates a flowchart illustrating a method that supports beam management for various levels of beam correspondence in accordance with various aspects of the present disclosure.

FIG. 9 illustrates a flowchart illustrating a method 900 that supports beam management for various levels of beam correspondence in accordance with various aspects of the present disclosure. The operations of method 900 may be implemented by a UE 115 or base station 105 or its components as described herein. For example, the operations of method 900 may be performed by a beam correspondence manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 905, UE 115 or base station 105 may perform a first beam sweep procedure to determine a first beam pair that includes a transmit beam of a first wireless node and a receive beam of a second wireless node. In certain examples, aspects of the operations of block 905 may be performed by a beam pair identification component as described with reference to FIGS. 5 and 6.

At block 910, UE 115 or base station 105 may identify a level of correspondence at one or both of the first wireless node and the second wireless node, the level of correspondence being between a transmit beam and a receive beam of a respective wireless node. In certain examples, aspects of the operations of block 910 may be performed by a beam correspondence component as described with reference to FIGS. 5 and 6.

At block 915, UE 115 or base station 105 may determine, based on the level of correspondence, a range of a second beam sweep procedure to be performed in determining a second beam pair that includes a transmit beam of the second wireless node and a receive beam of the first wireless node. In certain examples, aspects of the operations of block 915 may be performed by a beam sweep range component as described with reference to FIGS. 5 and 6.

Figure 10:
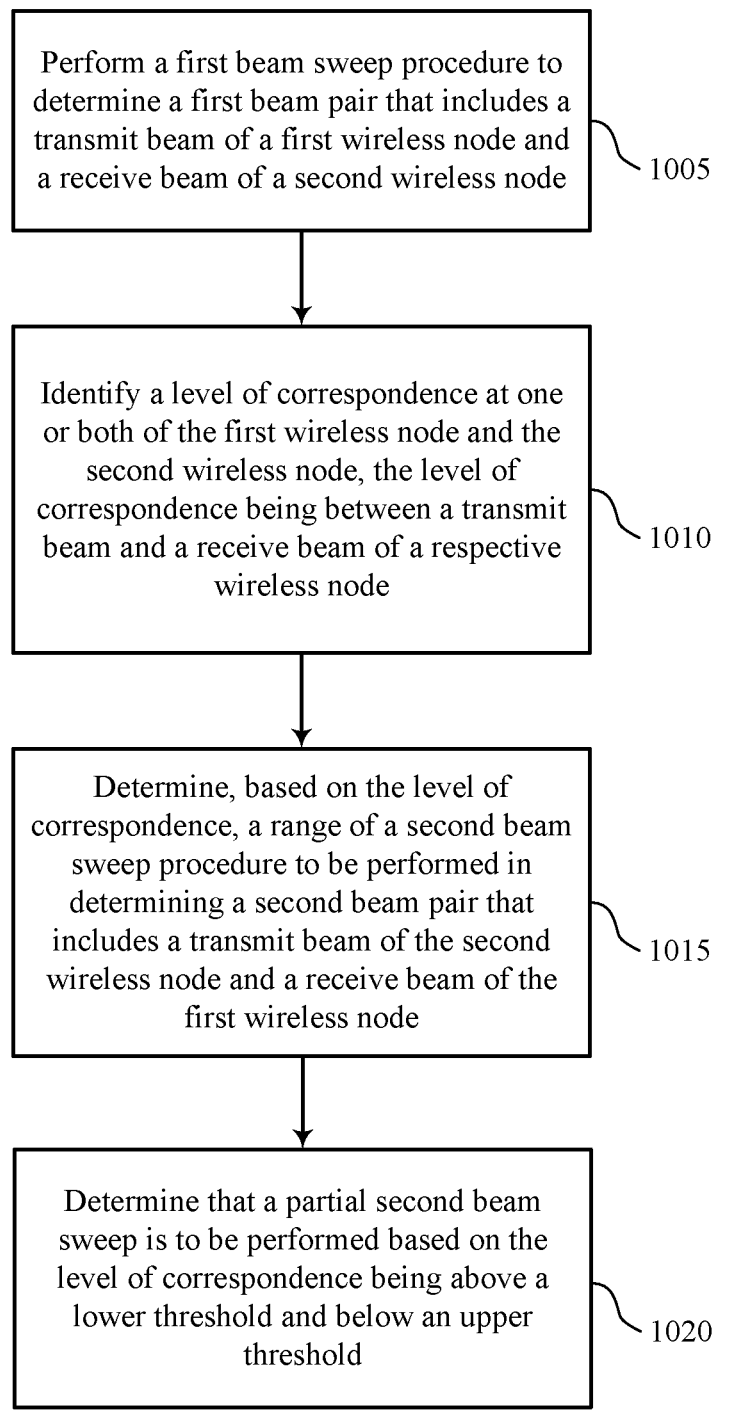
FIG. 10 illustrates a flowchart illustrating a method that supports beam management for various levels of beam correspondence in accordance with various aspects of the present disclosure.

FIG. 10 illustrates a flowchart illustrating a method 1000 that supports beam management for various levels of beam correspondence in accordance with various aspects of the present disclosure. The operations of method 1000 may be implemented by a UE 115 or base station 105 or its components as described herein. For example, the operations of method 1000 may be performed by a beam correspondence manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005, UE 115 or base station 105 may perform a first beam sweep procedure to determine a first beam pair that includes a transmit beam of a first wireless node and a receive beam of a second wireless node. The operations of block 1005 may be performed according to the methods described with reference to FIG. 9. In certain examples, aspects of the operations of block 1005 may be performed by a beam pair identification component as described with reference to FIGS. 5 and 6.

At block 1010, UE 115 or base station 105 may identify a level of correspondence at one or both of the first wireless node and the second wireless node, the level of correspondence being between a transmit beam and a receive beam of a respective wireless node. The operations of block 1010 may be performed according to the methods described with reference to FIG. 9. In certain examples, aspects of the operations of block 1010 may be performed by a beam correspondence component as described with reference to FIGS. 5 and 6.

At block 1015, UE 115 or base station 105 may determine, based on the level of correspondence, a range of a second beam sweep procedure to be performed in determining a second beam pair that includes a transmit beam of the second wireless node and a receive beam of the first wireless node. The operations of block 1015 may be performed according to the methods described with reference to FIG. 9. In certain examples, aspects of the operations of block 1015 may be performed by a beam sweep range component as described with reference to FIGS. 5 and 6.

At block 1020, UE 115 or base station 105 may determine that a partial second beam sweep is to be performed based at least in part on the level of correspondence being above a lower threshold and below an upper threshold. The operations of block 1020 may be performed according to the methods described with reference to FIG. 9. In certain examples, aspects of the operations of block 1020 may be performed by a beam sweep range component as described with reference to FIGS. 5 and 6.

Figure 11:
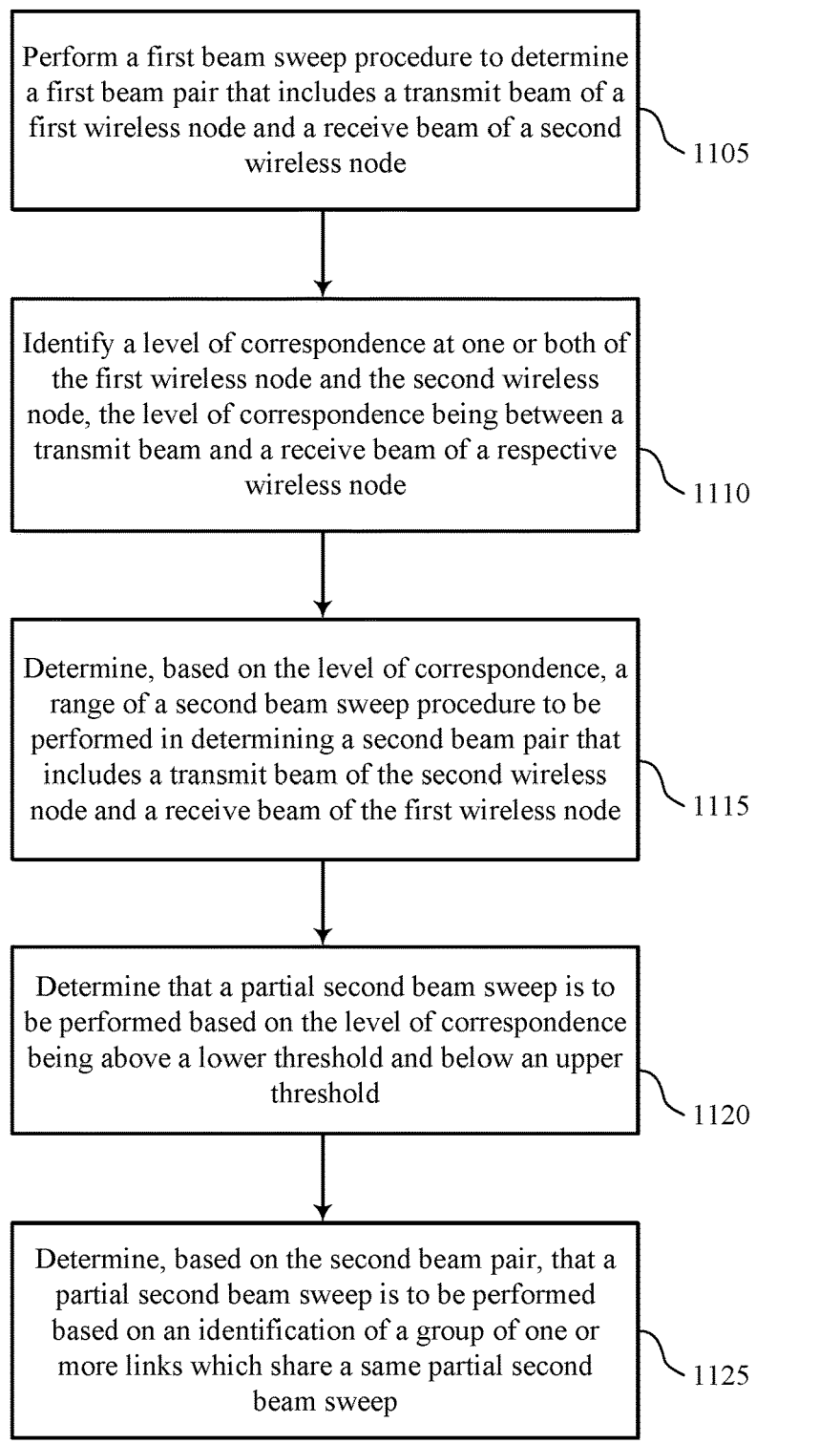
FIG. 11 illustrates a flowchart illustrating a method that supports beam management for various levels of beam correspondence in accordance with various aspects of the present disclosure.

FIG. 11 illustrates a flowchart illustrating a method 1100 that supports beam management for various levels of beam correspondence in accordance with various aspects of the present disclosure. The operations of method 1100 may be implemented by a UE 115 or base station 105 or its components as described herein. For example, the operations of method 1100 may be performed by a beam correspondence manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105, UE 115 or base station 105 may perform a first beam sweep procedure to determine a first beam pair that includes a transmit beam of a first wireless node and a receive beam of a second wireless node. The operations of block 1105 may be performed according to the methods described with reference to FIGS. 9 and 10. In certain examples, aspects of the operations of block 1105 may be performed by a beam pair identification component as described with reference to FIGS. 5 and 6.

At block 1110, UE 115 or base station 105 may identify a level of correspondence at one or both of the first wireless node and the second wireless node, the level of correspondence being between a transmit beam and a receive beam of a respective wireless node. The operations of block 1110 may be performed according to the methods described with reference to FIGS. 9 and 10. In certain examples, aspects of the operations of block 1110 may be performed by a beam correspondence component as described with reference to FIGS. 5 and 6.

At block 1115, UE 115 or base station 105 may determine, based on the level of correspondence, a range of a second beam sweep procedure to be performed in determining a second beam pair that includes a transmit beam of the second wireless node and a receive beam of the first wireless node. The operations of block 1115 may be performed according to the methods described with reference to FIGS. 9 and 10. In certain examples, aspects of the operations of block 1115 may be performed by a beam sweep range component as described with reference to FIGS. 5 and 6.

At block 1120, UE 115 or base station 105 may determine that a partial second beam sweep is to be performed is further based on an identification of a group of one or more links which share a same partial second beam sweep. The operations of block 1120 may be performed according to the methods described with reference to FIGS. 9 and 10. In certain examples, aspects of the operations of block 1120 may be performed by a group link identification component as described with reference to FIG. 6.

At block 1125, UE 115 or base station 105 may determine that the partial second beam sweep is to be performed based at least in part on the level of correspondence being above a lower threshold and below an upper threshold. The operations of block 1125 may be performed according to the methods described with reference to FIGS. 9 and 10. In certain examples, aspects of the operations of block 1125 may be performed by a group link identification component as described with reference to FIG. 6.

Figure 12:
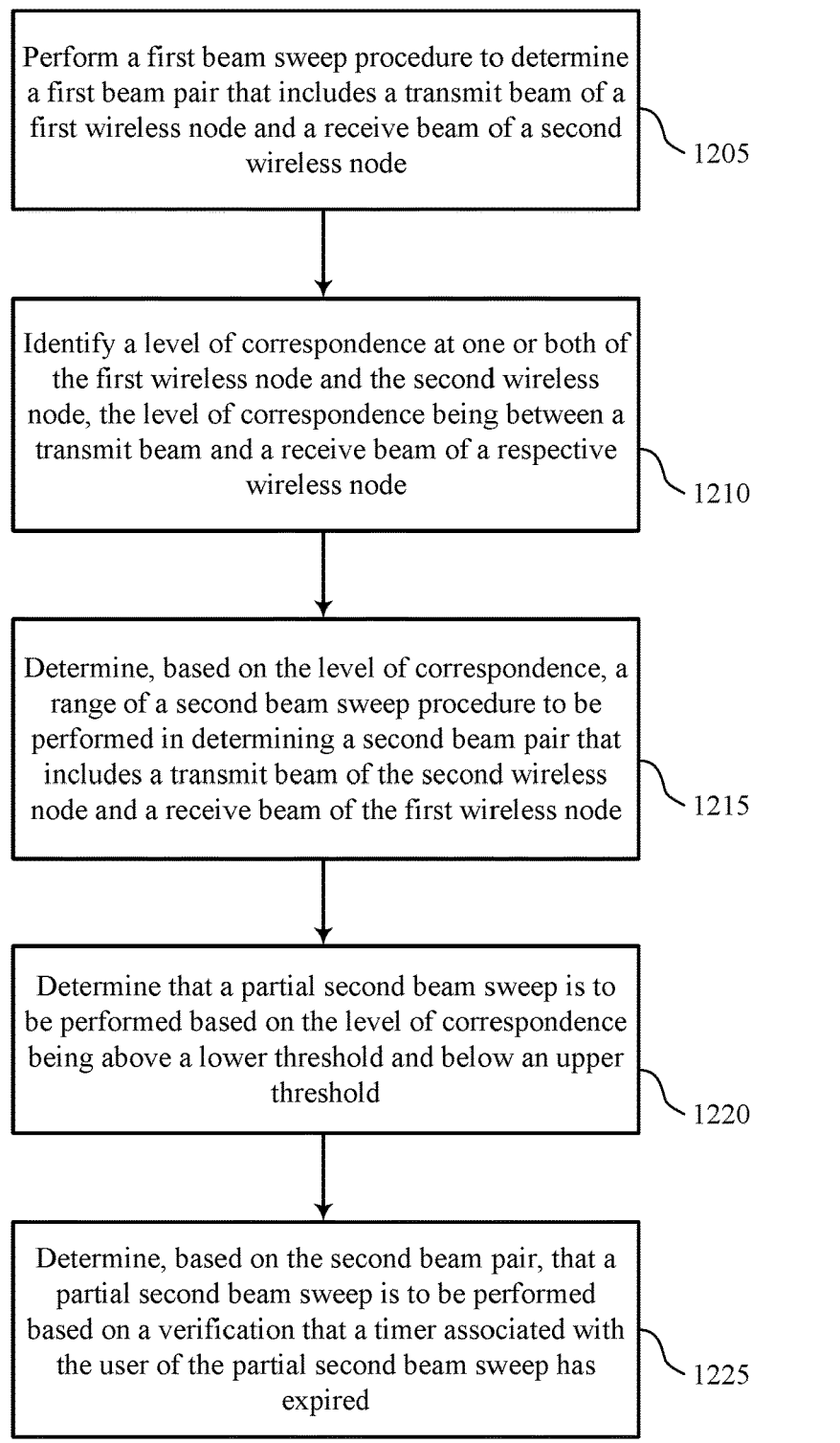
FIG. 12 illustrates a flowchart illustrating a method that supports beam management for various levels of beam correspondence in accordance with various aspects of the present disclosure.

FIG. 12 illustrates a flowchart illustrating a method 1200 that supports beam management for various levels of beam correspondence in accordance with various aspects of the present disclosure. The operations of method 1200 may be implemented by a UE 115 or base station 105 or its components as described herein. For example, the operations of method 1200 may be performed by a beam correspondence manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205, UE 115 or base station 105 may perform a first beam sweep procedure to determine a first beam pair that includes a transmit beam of a first wireless node and a receive beam of a second wireless node. The operations of block 1205 may be performed according to the methods described with reference to FIGS. 9 through 11. In certain examples, aspects of the operations of block 1205 may be performed by a beam pair identification component as described with reference to FIGS. 5 and 6.

At block 1210, UE 115 or base station 105 may identify a level of correspondence at one or both of the first wireless node and the second wireless node, the level of correspondence being between a transmit beam and a receive beam of a respective wireless node. The operations of block 1210 may be performed according to the methods described with reference to FIGS. 9 through 11. In certain examples, aspects of the operations of block 1210 may be performed by a beam correspondence component as described with reference to FIGS. 5 and 6.

At block 1215, UE 115 or base station 105 may determine, based on the level of correspondence, a range of a second beam sweep procedure to be performed in determining a second beam pair that includes a transmit beam of the second wireless node and a receive beam of the first wireless node. The operations of block 1215 may be performed according to the methods described with reference to FIGS. 9 through 11. In certain examples, aspects of the operations of block 1215 may be performed by a beam sweep range component as described with reference to FIGS. 5 and 6.

At block 1220, UE 115 or base station 105 may determine that a partial second beam sweep is to be performed based at least in part on the level of correspondence being above a lower threshold and below an upper threshold. The operations of block 1220 may be performed according to the methods described with reference to FIGS. 9 through 11. In certain examples, aspects of the operations of block 1220 may be performed by a timing component as described with reference to FIG. 6.

At block 1225, UE 115 or base station 105 may determine that the partial second beam sweep is to be performed is based on a verification that a timer associated with the use of the level of correspondence has expired. The operations of block 1225 may be performed according to the methods described with reference to FIGS. 9 through 11. In certain examples, aspects of the operations of block 1225 may be performed by a timing component as described with reference to FIG. 6.

Figure 13:
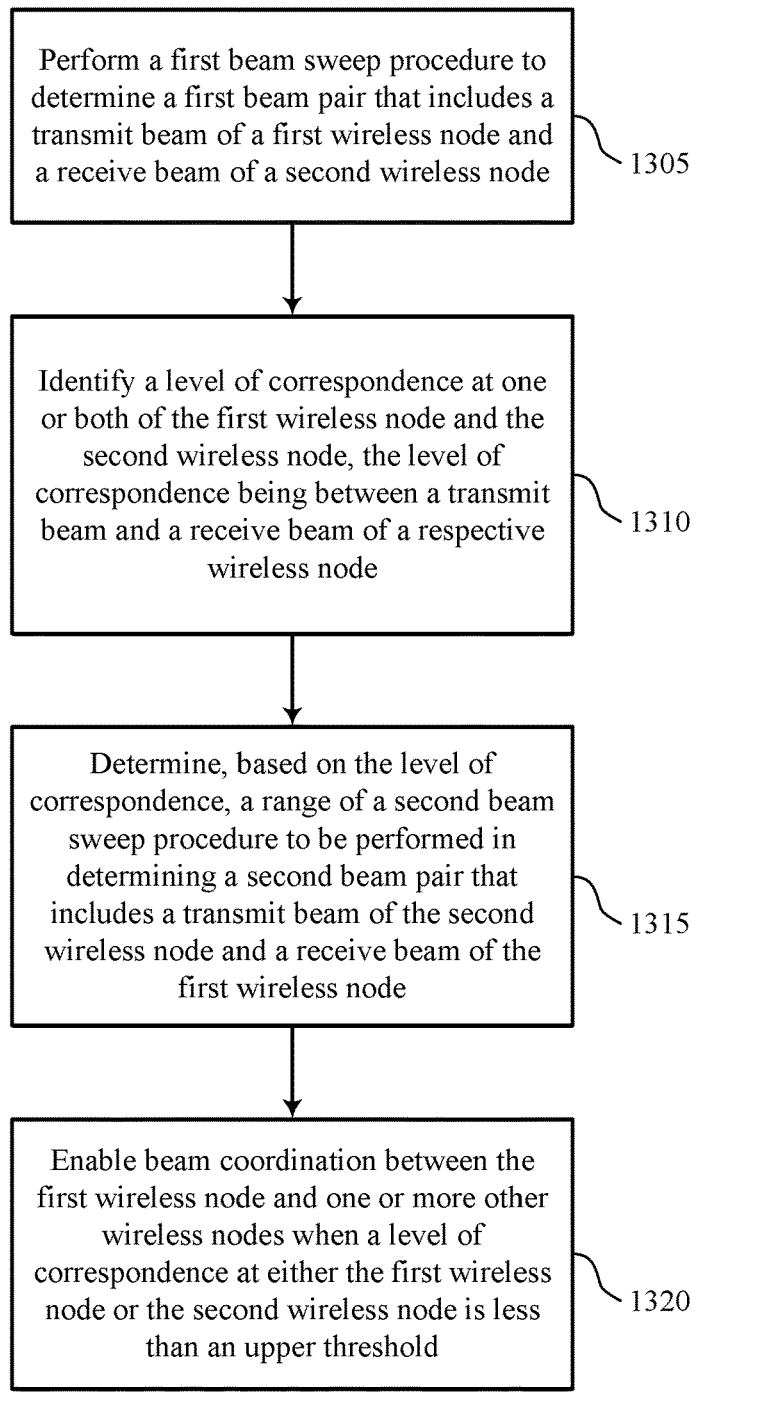
FIG. 13 illustrates a flowchart illustrating a method that supports beam management for various levels of beam correspondence in accordance with various aspects of the present disclosure.

FIG. 13 illustrates a flowchart illustrating a method 1300 that supports beam management for various levels of beam correspondence in accordance with various aspects of the present disclosure. The operations of method 1300 may be implemented by a UE 115 or base station 105 or its components as described herein. For example, the operations of method 1300 may be performed by a beam correspondence manager as described with reference to FIGS. 4 through 6. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305, UE 115 or base station 105 may perform a first beam sweep procedure to determine a first beam pair that includes a transmit beam of a first wireless node and a receive beam of a second wireless node. The operations of block 1305 may be performed according to the methods described with reference to FIGS. 9 through 12. In certain examples, aspects of the operations of block 1305 may be performed by a beam pair identification component as described with reference to FIGS. 5 and 6.

At block 1310, UE 115 or base station 105 may identify, a level of correspondence at one or both of the first wireless node and the second wireless node, the level of correspondence being between a transmit beam and a receive beam of a respective wireless node. The operations of block 1310 may be performed according to the methods described with reference to FIGS. 9 through 12. In certain examples, aspects of the operations of block 1310 may be performed by a beam correspondence component as described with reference to FIGS. 5 and 6.

At block 1315, UE 115 or base station 105 may determine, based on the level of correspondence, a range of a second beam sweep procedure to be performed in determining a second beam pair that includes a transmit beam of the second wireless node and a receive beam of the first wireless node. The operations of block 1315 may be performed according to the methods described with reference to FIGS. 9 through 12. In certain examples, aspects of the operations of block 1315 may be performed by a beam sweep range component as described with reference to FIG. 6.

At block 1320, UE 115 or base station 105 may enable beam coordination between the first wireless node and one or more other wireless nodes when a level of correspondence at either the first wireless node or the second wireless node is less than an upper threshold. The operations of block 1320 may be performed according to the methods described with reference to FIGS. 9 through 12. In certain examples, aspects of the operations of block 1320 may be performed by a beam coordination component as described with reference to FIG. 6.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    performing a first beam sweep procedure to determine a first beam pair that includes a transmit beam of a first wireless node and a receive beam of a second wireless node;
    identifying a level of correspondence, the level of correspondence being between a transmit beam and a receive beam of a respective wireless node; and
    determining, based at least in part on the level of correspondence being below a threshold, a range of a second beam sweep procedure to be performed in determining a second beam pair that includes a transmit beam of the second wireless node and a receive beam of the first wireless node, is equal to the range of the first beam sweep procedure.

2. A method for wireless communication, comprising:
    performing a first beam sweep procedure to determine a first beam pair that includes a transmit beam of a first wireless node and a receive beam of a second wireless node;
    identifying a level of correspondence, the level of correspondence being between a transmit beam and a receive beam of a respective wireless node; and
    determining that a second beam sweep procedure to determine a second beam pair is not to be performed based at least in part on the level of correspondence being above an upper threshold.

3. A method for wireless communication, comprising:
    performing a first beam sweep procedure to determine a first beam pair that includes a transmit beam of a first wireless node and a receive beam of a second wireless node;
    identifying a level of correspondence, the level of correspondence being between a transmit beam and a receive beam of a respective wireless node; and
    determining that a partial second beam sweep is to be performed based at least in part on the level of correspondence being above a lower threshold and below an upper threshold.

4. The method of claim 3, further comprising:
    determining the range of the second beam sweep procedure to be performed based on a range of calibration values associated with a transmit path and a receive path of the at least one of the first wireless node or the second wireless node.

5. The method of claim 3, wherein the calibration values indicate at least one of an amplitude and phase error of the transmit path and the receive path of the at least one of the first wireless node or the second wireless node.

6. The method of claim 3, wherein determining that the partial second beam sweep is to be performed is further based on an identification of a group of one or more downlinks or uplinks which share a same partial second beam sweep.

7. The method of claim 6, further comprising:
    identifying the group of one or more links through communications between the first wireless node and the second wireless node.

8. The method of claim 6, wherein the group of one or more links are associated with the first wireless node.

9. The method of claim 6, further comprising:
    resetting the group of one or more links as part of a radio link failure (RLF) or handover procedure.

10. The method of claim 3, wherein determining that the partial second beam sweep is to be performed is further based on a verification that a timer associated with the use of the level of correspondence has expired.

11. The method of claim 3, wherein determining that the partial second beam sweep is to be performed is further based on whether the second wireless node is participating in an initial access with the first wireless node.

12. The method of claim 3, wherein determining that the partial second beam sweep is to be performed is further based on whether the second wireless node is awaking in connected mode from a discontinuous reception (DRX) cycle whose duration exceeds a threshold.

13. The method of claim 3, wherein determining that the partial second beam sweep is to be performed is further based on whether the second wireless node is in an inactive state.

14. A method for wireless communication, comprising:
    performing a first beam sweep procedure to determine a first beam pair that includes a transmit beam of a first wireless node and a receive beam of a second wireless node;
    identifying a level of correspondence, the level of correspondence being between a transmit beam and a receive beam of a respective wireless node; and
    determining, based on the level of correspondence, a range of a second beam sweep procedure to be performed in determining a second beam pair that includes a transmit beam of the second wireless node and a receive beam of the first wireless node;
    wherein the second beam sweep is limited to a beam sweep at only one of the first wireless node or the second wireless node when the level of correspondence at the other of the first wireless node or the second wireless node is above an upper threshold.

15. The method of claim 2, wherein determining the level of correspondence comprises:
    receiving one or more signals from which the level of correspondence is determined.

16. The method of claim 2, wherein the first beam sweep procedure is based at least in part on a synchronization signal transmission procedure, or a beam reference signal, or a beam refinement reference signal, or a channel state information reference signal (CSI-RS), or a mobility reference signal procedure, or a combination thereof.

17. An apparatus for wireless communication, comprising:

means for performing a first beam sweep procedure to determine a first beam pair that includes a transmit beam of a first wireless node and a receive beam of a second wireless node;

means for identifying a level of correspondence, the level of correspondence being between a transmit beam and a receive beam of a respective wireless node; and means for determining that a second beam sweep procedure to determine a second beam pair is not to be performed based at least in part on the level of correspondence being above an upper threshold.

18. An apparatus for wireless communication, in a system comprising:

a processor;

memory in electronic communication with the processor; and instructions stored in the memory and operable, when executed by the processor, to cause the apparatus to:

perform a first beam sweep procedure to determine a first beam pair that includes a transmit beam of a first wireless node and a receive beam of a second wireless node;

identify a level of correspondence, the level of correspondence being between a transmit beam and a receive beam of a respective wireless node;

determine, based on the level of correspondence, a range of a second beam sweep procedure to be performed in determining a second beam pair that includes a transmit beam of the second wireless node and a receive beam of the first wireless node; and determine that the range of the second beam sweep procedure is equal to a range of the first beam sweep procedure based at least in part on the level of correspondence being below a lower threshold.

19. An apparatus for wireless communication, in a system comprising:

a processor;

memory in electronic communication with the processor; and instructions stored in the memory and operable, when executed by the processor, to cause the apparatus to:

perform a first beam sweep procedure to determine a first beam pair that includes a transmit beam of a first wireless node and a receive beam of a second wireless node;

identify a level of correspondence, the level of correspondence being between a transmit beam and a receive beam of a respective wireless node; and determine that a second beam sweep procedure to determine a second beam pair is not to be performed based at least in part on the level of correspondence being above an upper threshold.

20. An apparatus for wireless communication, in a system comprising:

a processor;

memory in electronic communication with the processor; and instructions stored in the memory and operable, when executed by the processor, to cause the apparatus to:

perform a first beam sweep procedure to determine a first beam pair that includes a transmit beam of a first wireless node and a receive beam of a second wireless node;

identify a level of correspondence, the level of correspondence being between a transmit beam and a receive beam of a respective wireless node;

determine, based on the level of correspondence, a range of a second beam sweep procedure to be performed in determining a second beam pair that includes a transmit beam of the second wireless node and a receive beam of the first wireless node and determine that a partial second beam sweep is to be performed based at least in part on the level of correspondence being above a lower threshold and below an upper threshold.

21. The apparatus of claim 20, wherein the instructions are further executable by the processor to:

determine the range of the second beam sweep procedure to be performed based on a range of calibration values associated with a transmit path and a receive path of the at least one of the first wireless node or the second wireless node.

22. The apparatus of claim 21, wherein the calibration values indicate at least one of an amplitude and phase error of the transmit path and the receive path of the at least one of the first wireless node or the second wireless node.

23. The apparatus of claim 20, wherein the instructions for determining that the partial second beam sweep is to be performed is further based on an identification of a group of one or more links which share a same partial second beam sweep.

24. The apparatus of claim 23, wherein the instructions are further executable by the processor to:

identify the group of one or more links through communications between the first wireless node and the second wireless node.

25. The apparatus of claim 23, wherein the group of one or more links are associated with the first wireless node.

26. The apparatus of claim 23, wherein the instructions are further executable by the processor to:

reset the group of one or more links as part of a radio link failure (RLF) or handover procedure.

27. The apparatus of claim 20, the instructions for determining that the partial second beam sweep is to be performed is further based on a verification that a timer associated with the use of the level of correspondence has expired.

28. A non-transitory computer readable medium storing code for wireless communication, the code comprising instructions executable by a processor to:

perform a first beam sweep procedure to determine a first beam pair that includes a transmit beam of a first wireless node and a receive beam of a second wireless node;

identify a level of correspondence, the level of correspondence being between a transmit beam and a receive beam of a respective wireless node; and determining that a second beam sweep procedure to determine a second beam pair is not to be performed based at least in part on the level of correspondence being above an upper threshold.

29. The method of claim 3, wherein determining the level of correspondence comprises:

receiving one or more signals from which the level of correspondence is determined.

30. The method of claim 3, wherein the first beam sweep procedure is based at least in part on a synchronization signal transmission procedure, or a beam reference signal, or a beam refinement reference signal, or a channel state information reference signal (CSI-RS), or a mobility reference signal procedure, or a combination thereof.

* * * * *